United States Patent
Podowski

(10) Patent No.: US 7,392,508 B1
(45) Date of Patent: Jun. 24, 2008

(54) SOFTWARE OSCILLOSCOPE

(76) Inventor: Robert Podowski, 931 Banbury Rd., Mundelein, IL (US) 60060-1120

( * ) Notice: Subject to any disclaimer, the term of this patent is extended or adjusted under 35 U.S.C. 154(b) by 782 days.

(21) Appl. No.: 10/863,546

(22) Filed: Jun. 7, 2004

(51) Int. Cl.
*G06F 9/45* (2006.01)

(52) U.S. Cl. ...................................................... 717/125

(58) Field of Classification Search .................. 717/125
See application file for complete search history.

(56) References Cited

U.S. PATENT DOCUMENTS

| | | | |
|---|---|---|---|
| 6,671,876 B1 * | 12/2003 | Podowski | 717/130 |
| 7,013,456 B1 * | 3/2006 | Van Dyke et al. | 717/130 |
| 2004/0255167 A1 * | 12/2004 | Knight | 713/201 |
| 2005/0235058 A1 * | 10/2005 | Rackus et al. | 709/224 |

OTHER PUBLICATIONS

Logic Analyzers: Beyond 1'S and 0'S; ECN Magazine, May 2004, pp. 27-28; www.ECNMAG.com.

* cited by examiner

*Primary Examiner*—John Chavis
(74) *Attorney, Agent, or Firm*—Wildman, Harrold, Allen & Dixon LLP

(57) ABSTRACT

The execution over time of software code is displayed such as on the screen of a cathode ray tube by inserting probes into blocks of code and displaying each probe as the various blocks of code are executed. The execution of various blocks of code is presented in a spatial manner to provide information regarding the sequential operation of, and the temporal relationships among, the various blocks of code. This software code operating information is displayed in real time or may be stored for subsequent recall and display. The start and stop of observation of software code operation may be pre-programmed for automatic monitoring, or monitoring may be triggered by an event. By visually observing the operation of the software program, correlation can be established between execution of the various blocks of code and expected system responses or events leading to a better understanding of program operation and design.

47 Claims, 36 Drawing Sheets

| CODE BLOCK ID | CODE BLOCK TIME STAMP | TYPE |
|---|---|---|
| 1 | 00:15.005  07/27/2003 | START |
| 1 | 00:15.023  07/27/2003 | FINISH |

41　　　　　　42　　　　　　　　43

44　　　　　　45　　　　　　　　46

| | | |
|---|---|---|
| 3 | 00:15.045  07/27/2003 | START |
| K | 00:15.069  07/27/2003 | START |
| 3 | 00:15.075  07/27/2003 | FINISH |
| 2 | 00:15.079  07/27/2003 | START |
| K | 00:15.084  07/27/2003 | FINISH |

(DATA FORMAT)

FIG. 4

Note: T4 > T3 > T2 > T1

$$\text{mean} = \frac{1}{n}\sum_{i=1}^{n} x_i$$

$$\text{standard deviation} = \sqrt{\frac{\sum_{i=1}^{n} x_i^2 - \frac{1}{n}\left(\sum_{i=1}^{n} x_i\right)^2}{n-1}}$$

SOFTWARE OSCILLOSCOPE

FIELD OF THE INVENTION

The present invention relates to the art of software analysis. It finds particular application in displaying software code as it executes in real time. It finds further application in developing an understanding of how software works and thus in controlling software expansion and fixing software problems. It finds still further application in observing software operation in remote locations. Just like opening a pocket watch to observe rotating gears that cause the hands to move, this invention opens the computer for observing the code executions that move robotic arms, control x-ray machines, paint computer display screens, play MP3 music, play DVD movies, and much more.

BACKGROUND OF THE INVENTION

Computer software is used to control numerous products and systems. Software is continuing to expand in both size and complexity at an exponential rate. True comprehension of how many systems that operate under software control is beyond the understanding of individual programmers. Examples of this lack of understanding and control are many and include, (1) the need for the Ctrl-Alt-Del key combination to regain control of a "locked-up" operating system, (2) the need for "watchdog timers" in hardware circuitry to recognize when a computer has gone out of control and must be reset automatically, and (3) programmers regularly write code patches to fix symptoms and not the problem.

A commercial product currently available for use in developing and trouble shooting digital equipment is known as a logic analyzer. A logic analyzer is a memory storage device having many inputs connected directly to a data base or to the particular circuit being observed which converts the 1's and 0's from a microprocessor to assembly-language mnemonics that software developers can use to trace the execution of code blocks. A "timing mode" of acquisition allows for timing analysis of the relationship between digital signals, while a "state mode" of acquisition allows for state analysis of digital signals at specific clock-transition times. Logic analyzers read direct electrical signals, translate these signals into operational code, and are somewhat difficult to operate.

This invention presents an instrument that can be used to view software code as it is operating in real time. Much like an oscilloscope that views voltage changes in hardware, this invention displays the individual blocks of software code as they are called to operate by their operating system in a computer-controlled product.

By observing the operations of the product and at the same time observing the software code that is producing these operations, many advantages follow, including those in the following list:

1) A correlation can be established between the execution of a block of code and the expected system response or event.

2) Old unused code that is no longer needed can be identified and discarded. This frees up computer memory and thus saves cost.

3) The amount of time being used by blocks of code can be displayed and measured. Unlike memory space, there is no simple way to measure available time. If execution time is available, then features may be added to existing hardware. Redesigning hardware for faster processors would not be necessary.

4) Long term problems can be identified by logging software operations, and later correlating the occurrence of problems with the software operating at that time.

5) The true sequences of code blocks can be observed as they evolve. The true sequential nature of code as it executes can be observed and studied.

6) Current practice is to infer code execution by observing system actions. Now code execution and resultant actions can be observed simultaneously.

7) Code execution can be observed locally and remotely anywhere on this planet by direct connection such via the Internet.

8) Code execution can be observed remotely anywhere on and off this planet by wireless connections. An operator on earth can observe code operation on a target computer located on Mars with a wireless connection.

9) Rare occurrence problems can be identified by logging software operations, and later correlating the captured rare occurrence of the problem with the software operating at that time.

OBJECTS AND SUMMARY OF THE INVENTION

Accordingly, it is an object of the present invention to provide a visual representation of the execution of software code in a computer program.

It is another object of the present invention to provide a visual presentation of the temporal execution of blocks of software code in a computer program such as on a cathode ray tube (CRT) monitor as a programming aid.

Yet another object of the present invention is to improve the understanding in computer software programming of the correlation between the sequential execution of software codes and the actions being carried out under the control of a computer in accordance with these codes.

A still further object of the present invention is to provide a visual display of the temporal relationship of execution of various blocks of software code in a computer program in various forms of spatially related objects presented on the display screen of a CRT.

This invention contemplates a method for monitoring the operation of a computer program including plural software code blocks, the method comprising the steps of: providing each code block with a probe representing the start and finish of the code block; operating the computer program, wherein each of the code blocks is sequentially executed; detecting the probe of each executed code block; comparing each probe with a clock signal and assigning a start time and a finish time for each executed code block; and displaying the start and finish times of each of the executed code blocks in a sequential manner on a video display.

BRIEF DESCRIPTION OF THE DRAWINGS

The invention may take form in various components and arrangements of components, and in various steps and arrangements of steps. The following drawings are only for purposes of illustrating preferred embodiments and are not to be construed as limiting the invention. Further, it is to be appreciated that the drawings are not to scale. Many details are sometimes omitted from the various figures in the interest of clarity. Actual display screens are much larger and in color and can accommodate all features of this invention and still appear uncluttered.

FIG. 4 is a diagrammatic illustration showing the format of data collected by the probe and used by this invention in displaying code execution.

FIG. 8a is a composite of FIGS. 8b, 8c, 8d, and 8e, which are more detailed as discussed below.

DETAILED DESCRIPTION OF THE PREFERRED EMBODIMENTS

Figure 1:
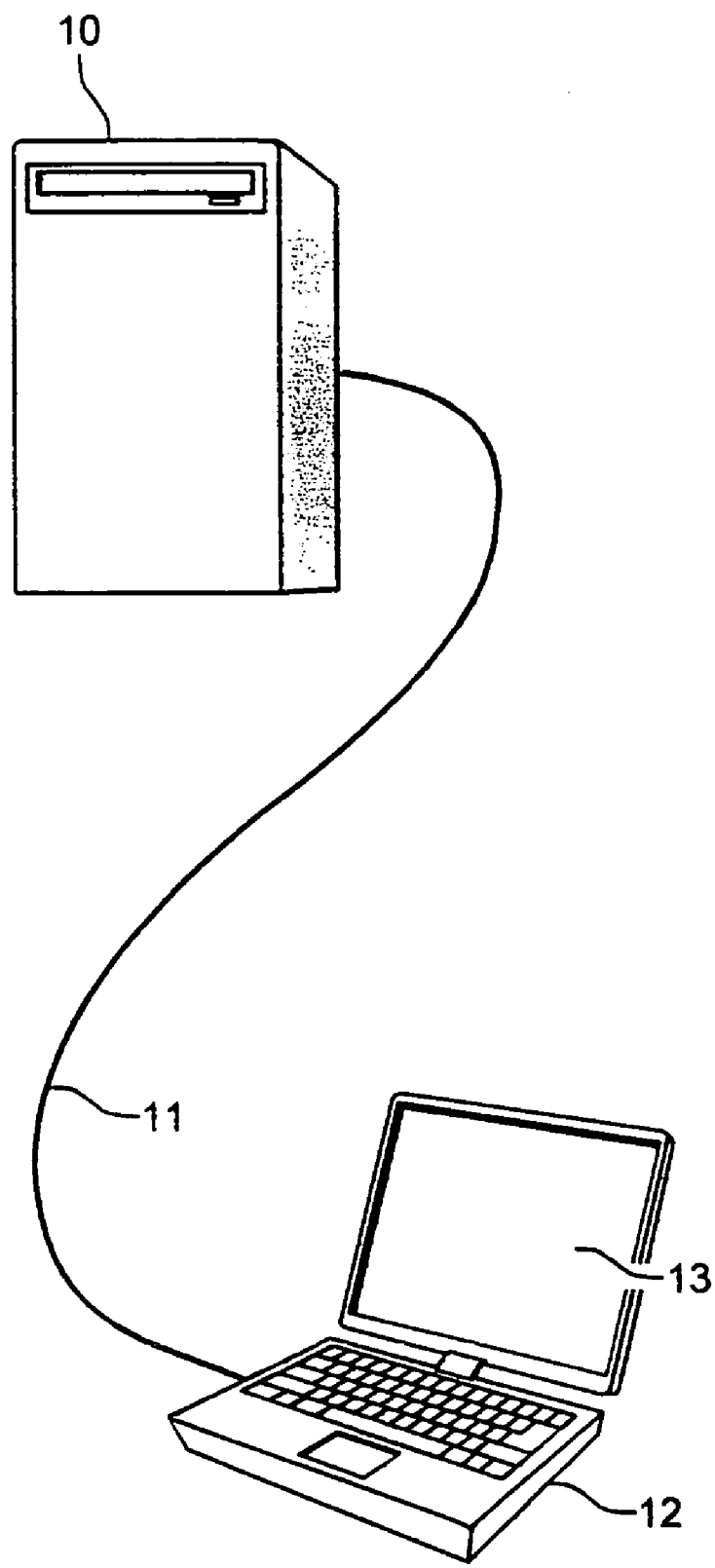
FIG. 1 is a diagrammatic illustration showing the inventive software oscilloscope operating in a laptop computer. The software code that is operating in the target hardware computer is observed while it is executing, on the display screen of the laptop computer. Software oscilloscope probes are connected to the target hardware computer by means of a directly connected cable. The use of a laptop computer is meant to illustrate the invention. The software oscilloscope can operate in any computer platform.

With reference to FIG. 1, target hardware 10 includes a computer that is running software. Laptop computer 12 using probes and connected to the target hardware 10 via connection 11 displays the execution of hardware 10 code blocks on display 13. Code block execution is displayed in real time. These data are also written to a file for later viewing. Connection 11 can be implemented as data carried via serial ports, USB ports or firewire (I.E.E.E. 1394) ports.

Figure 2A:
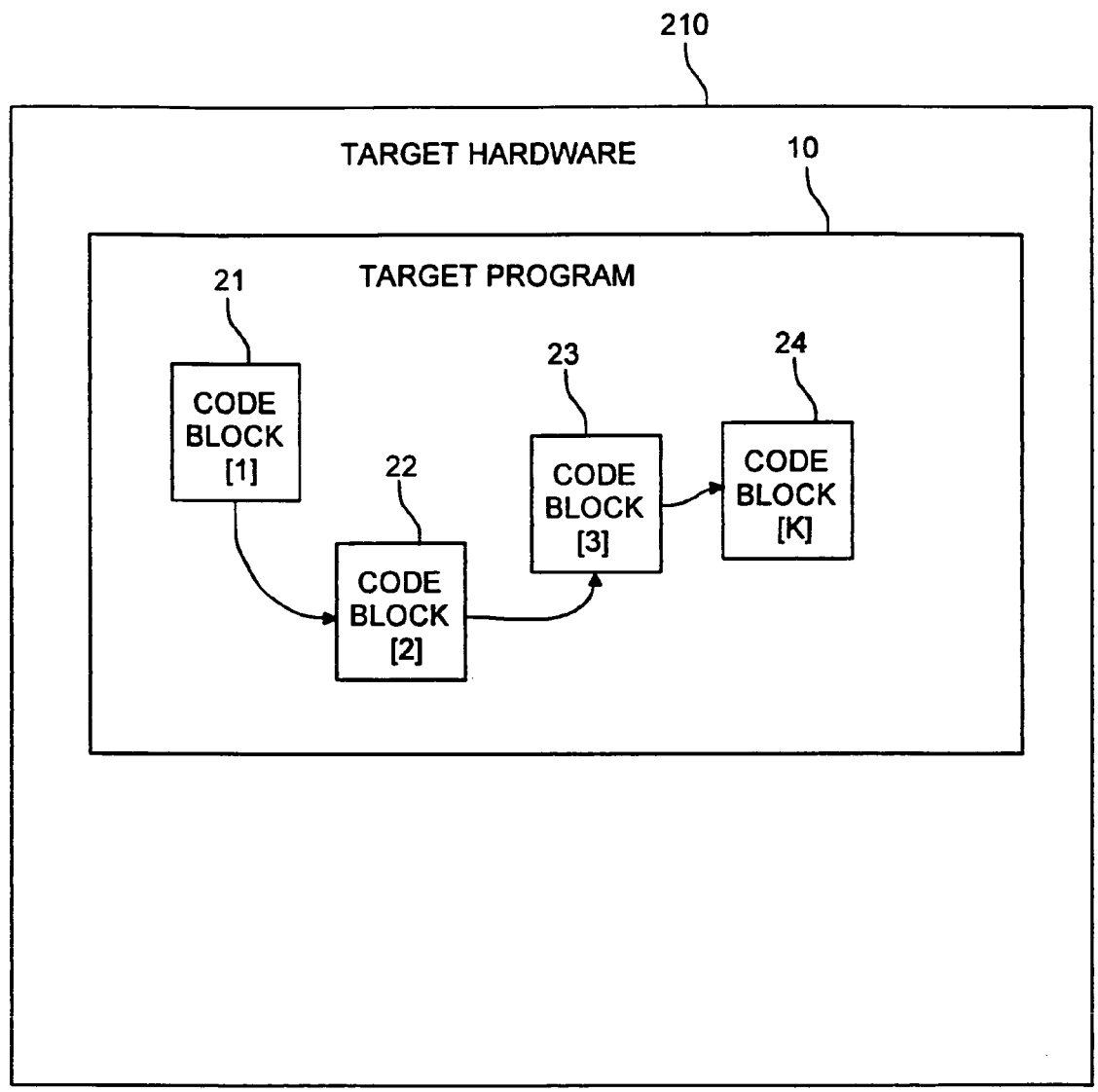
FIG. 2a is a diagrammatic illustration of a typical prior art arrangement showing software code in a target system. The target system is the system whose code executions will be displayed by this invention. A target program that consists of many separate software code blocks runs the target hardware. As an example, this target hardware computer may be handling the movement of a robotic arm in a manufacturing plant. To the prior art observer, the software controlling the movement of the arm cannot be observed. Only the movements of the arm (the results of the software block executions) can be observed.

With reference to FIG. 2a, the target hardware 210 is shown in conventional operation. This is the prior art. Code blocks 21, 22, 23 and 24 represent blocks of computer software or code. All are part of the Target Program 20 shown in FIG. 2b. Typical operation is for blocks of code to be operated in some sequence. In this example, a partial sequence is 21 to 22 to 23 to 24.

Figure 2B:
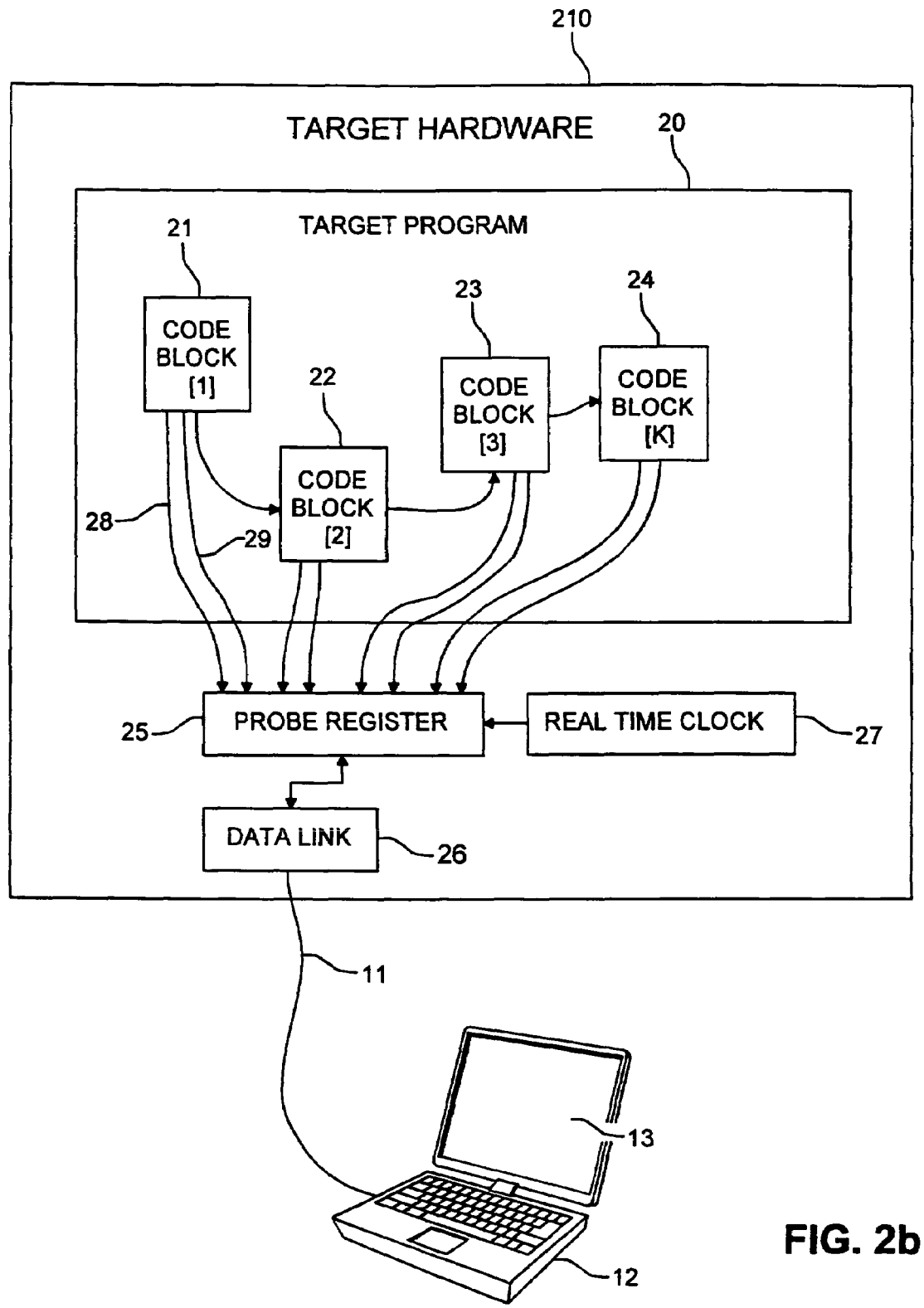
FIG. 2b is a diagrammatic illustration showing software code in the same target system as in FIG. 2a. Additions are made to the target system that provide the means to observe the code blocks as they execute. Shown are the probe register, the real time clock and the data link that are part of this invention. They must be added to the target hardware as part of this invention. As a consequence of this invention, not only can the movements of the robotic arm be observed, but the code blocks executing at the same time and directing the movements of the robotic arm can also be observed and studied.

With reference to FIG. 2b, the target hardware 210 is shown with elements of this invention added. As blocks of code operate, they also tell the probe register 25 who they are and when they start execution and when they finish execution. For example, when code block [1] 21 starts execution it sends an indication 28 to the probe register 25. When code block [1] 21 finishes execution, it sends an indication 29 to the probe register 25. Subsequent code block executions also identify themselves, and send indications to the probe register 25 when they start execution and when they finish execution. Probe register 25 appends a time stamp provided by a real time clock 27 at the moment these indications arrive.

The probe register contents are transmitted over a link 11 and data link 26 protocol to a software oscilloscope. The data format is shown later in FIG. 4. Data can be sent over this link in real time or in a file that is to be read later.

Code block execution continues as in prior art FIG. 2a. The impact of this invention to the operation of target hardware is explained as follows. This invention adds the virtual probes that record the identity and starting and finishing times of code block executions. The impact to overall target hardware code execution time is minimal and steady and known. Once these probes are added, they remain a part of the code. Any timing impact is fixed and factored into the overall execution times. This is an improvement over previous methods of observing code execution, some of which present varying impact on code execution time.

Figure 3:
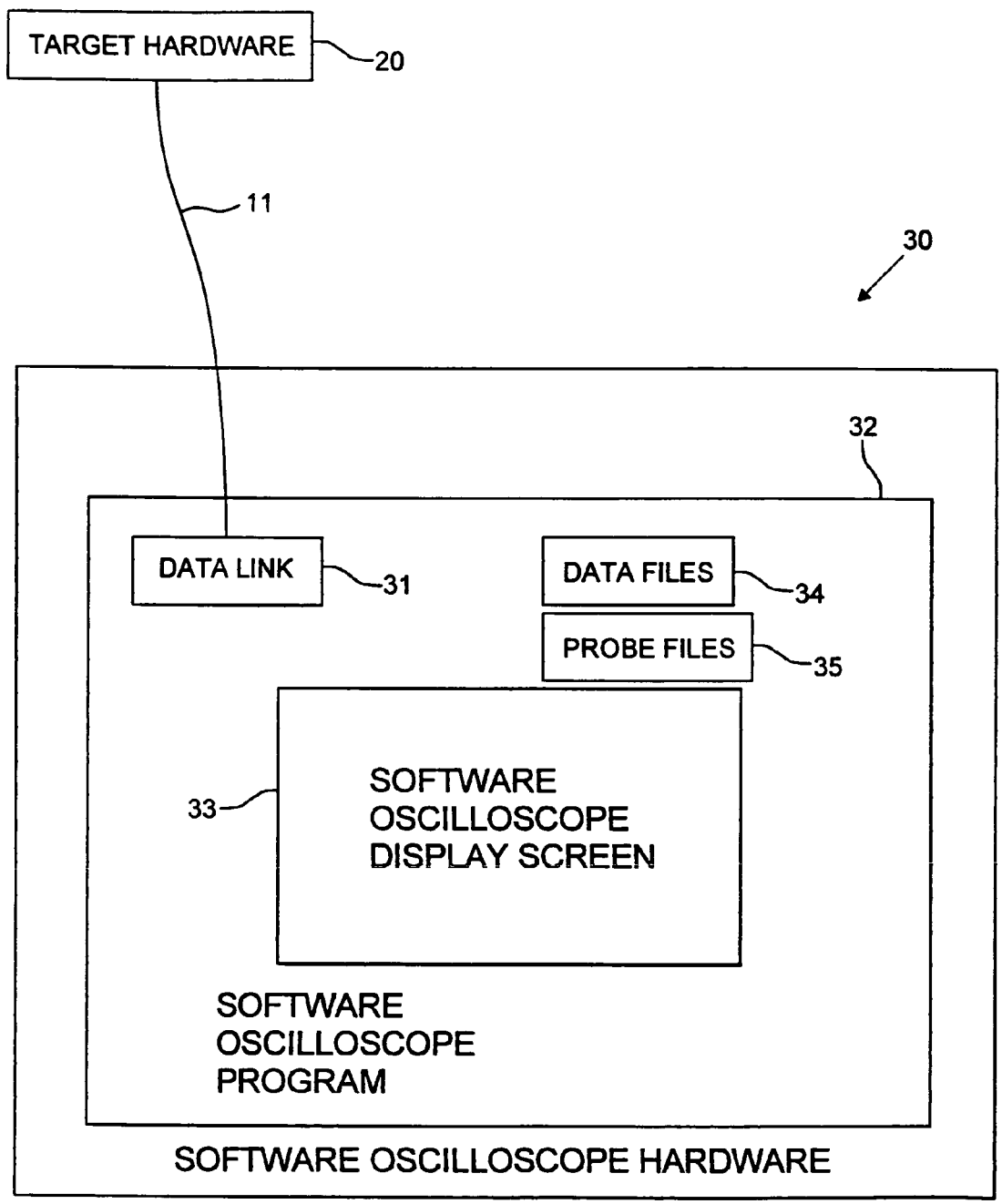
FIG. 3 is a diagrammatic illustration showing the cable connection to the target system and a high-level block diagram of the inventive software oscilloscope. Also shown are the probe files and the data files used in displaying data.

With reference to FIG. 3, a data link 31 receives the real time data from the target hardware 20. The software oscilloscope program 32 processes these data and along with selections made by the user, presents these data for viewing on the software oscilloscope display screen 33. The software oscilloscope hardware 30 is shown as a laptop computer for illustrative purposes. It can be any computer with a display screen that is running this inventive software. Target hardware code execution is viewed in real time. Code execution can also be viewed later by retrieving files 34 with recorded data. Retrieved files also contain probe data which is stored in probe files 35.

With reference to FIG. 4, the data format consists of the identification of each code block, a time stamp and a type stamp. An example of the data collected from the target hardware is code block 3 44 which started 46 execution at 15 minutes 45 milliseconds past midnight on Jul. 27, 2003 45. Another example is code block 1 41 that finished execution 43 on Jul. 27, 2003 at 15 minutes and 23 milliseconds 42 after midnight.

Figure 5:
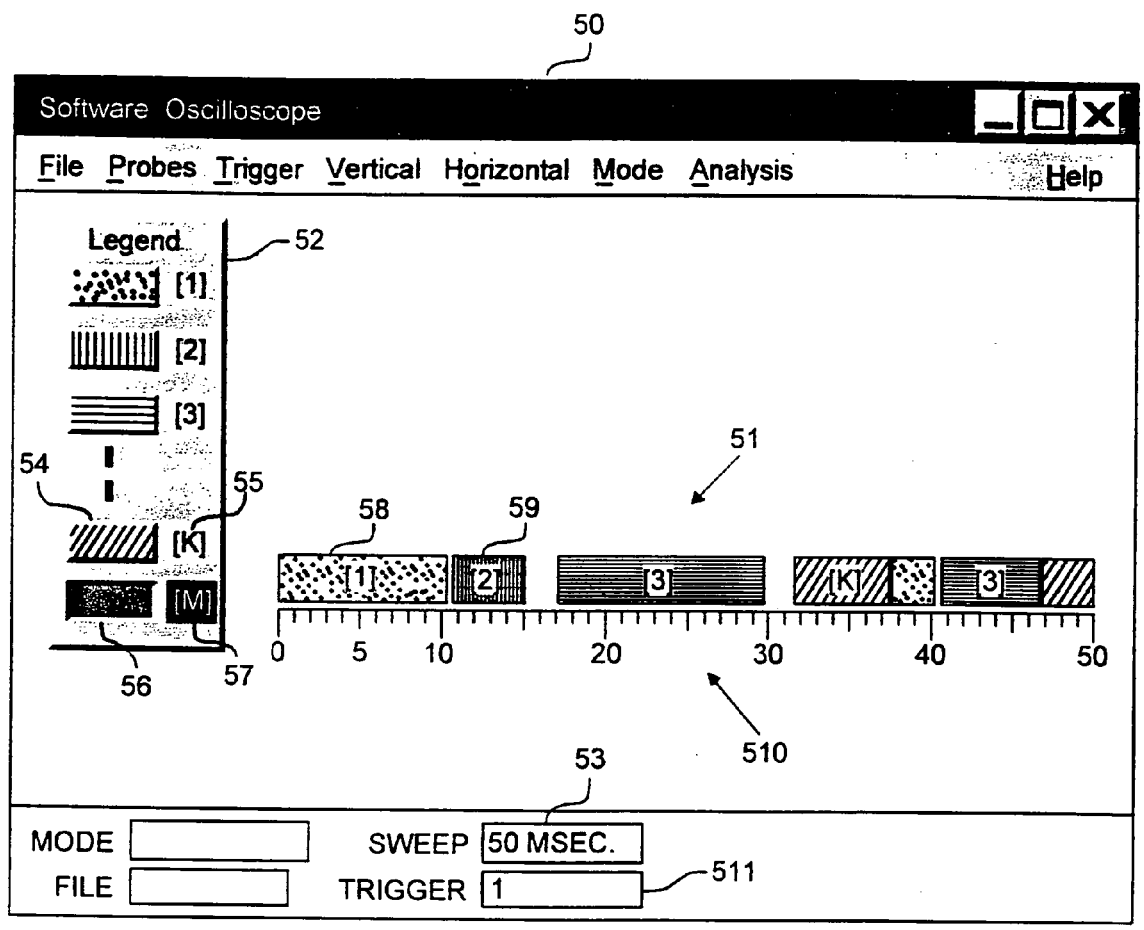
FIG. 5 is a diagrammatic illustration showing how code blocks are displayed as they execute. The general display environment is a Windows-type display. The legend at the left side displays the assignment of patterns (or colors) and the code blocks they represent. The code executions are shown on the horizontal time line. In this example, a total of 50 milliseconds of operation have been observed, recorded and is displayed. In this display version, time starts at the left and moves to the right like the flow of a river.

With reference to FIG. 5, a window style environment 50 is used to frame the data displayed by this invention. Legend 52 displays the probes (code blocks) that are available for viewing. Legend 52 buttons also serve as switches. Clicking on the buttons alternates between selected and de-selected. Button 56 shows the color assigned to represent code block [M] 57 as available but de-selected. This means that if code block [M] had executed in this time frame, it would appear as a gray block, and the same color gray as all other de-selected blocks. Code blocks [1], [2], [3] and [K] are displayed on a horizontal time line 51. This is one of many ways of displaying data. This particular method is called the River display method. The progression of time is similar to the flow of a river. The actual start execution and finish execution times are shown on time line 510. As an example, code block [1] 58 began execution at time 0 and finished execution 10 milliseconds later. Immediately following, code block [2] 59 started to execute. Different patterns (or colors) are assigned to different code blocks. For example, code block [K] 55 is indicated by the slanted stripe pattern 54. Where space permits, code blocks are also identified on the data display 59 as seen on code block [2] and others.

Again, with reference to FIG. 5, when data are displayed on a conventional hardware oscilloscope, the data will drift across the display unless it is synchronized to the horizontal sweep that drives the display. Synchronization is accomplished in many ways. One of these ways is the use of a trigger source. When a trip point at the trigger source is reached, the display begins its sweep.

In the case of the inventive software oscilloscope, the code block data can be displayed in many ways. The first way is to let the data flow freely across the screen. Imagine data 51 appearing from left to right. This is similar to moving light displays that stream news headlines on the sides of buildings, or the stock symbols that move across the bottom of a TV screen. At the same time, the time line 510 (the graduated scale) remains fixed. This is how data is displayed with no trigger set. This is also called free running. In this manner, 50 millisecond blocks of time are displayed continuously as time flows. The operator made the choice of 50 milliseconds as the sweep rate 53. This is useful for observing software operation on a continuous basis, and in real time.

User selections can be made to have the display painted in other than real time. For example, the display can be painted where 1 microsecond equals 1 second on the display. This slow motion rate allows more time for the user to study the displayed information.

A second way is to set a trigger. In FIG. 5, the trigger is selected to be code block [1] 511. This means that the display began painting the image when code block [1] began execution. It continued painting until it reached the end of the sweep period selected 53. It then stopped painting an image. This is useful for capturing data relative to some particular code block.

Figure 7:
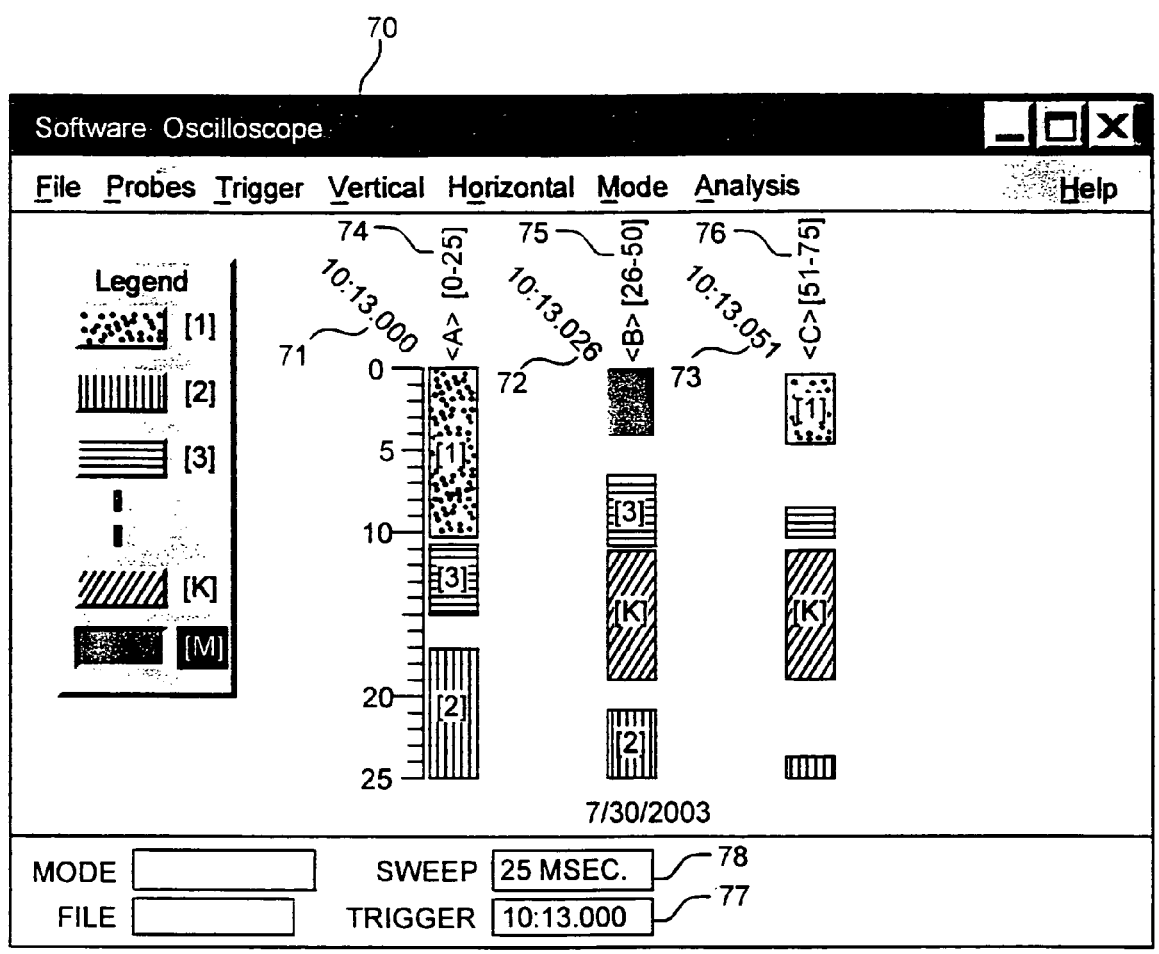
FIG. 7 is a diagrammatic illustration showing an alternate approach to displaying code execution. In this version, time starts at the top left and moves down like a waterfall. The succeeding time periods are arranged sequentially from left to right. Time flows to the bottom of a column and restarts at the top of the next column on the right.

A third way is to trigger the start of painting data as shown in FIG. 7. In this case, the trigger is selected as a point in time. Specifically, 10:13 a.m. 77 is the starting time for data to be displayed. Data is displayed in this waterfall manner in 25 millisecond blocks. This is useful in retrieving data for some predetermined time.

Figure 6:
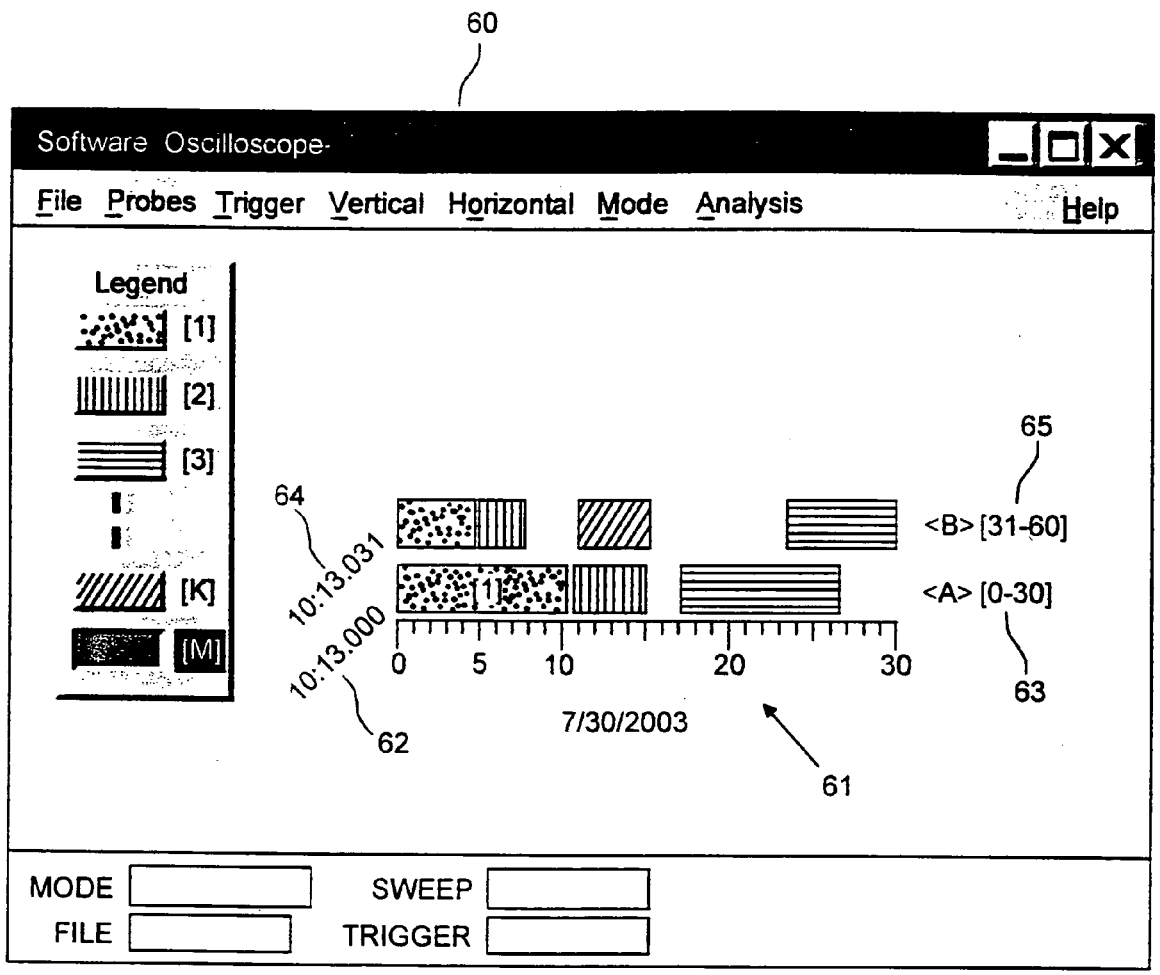
FIG. 6 is a diagrammatic illustration showing how an additional 50 milliseconds of code execution are displayed. It appears on top of the first 50 milliseconds. The start times of each period are shown at the beginning of each line.

With reference to FIG. 6, more details of how data may be displayed are shown at 60. The horizontal time line 61 is calibrated from 0 to 30 milliseconds. The first 30 milliseconds 62 of displayed data started execution at 10:13 64 on Jul. 30, 2003. This is called group <A> 63. The next time period is displayed over the first. It 64 continues from 10:13 and 31 milliseconds. It is called group <B> 65. Successive time periods are stacked in this manner. This provides a means of displaying more data in a fixed display space.

With reference to FIG. 7, another one of many ways of displaying data is shown at 70. This particular method is called the Waterfall display method. The progression of time is similar to the flow of a waterfall. The first vertical column 74 displays codes block execution for the first 25 milliseconds starting at 10:13 on Jul. 30, 2003 71. This group is called <A> 74 and the execution interval is shown. The next vertical column starts at the top and continues where the other one left off. Each vertical column has an indication of when the code executions began at 71, 72 and 73. Each vertical column has a group designation such as <A> <0-25> 74, <B> <26-50> 75, and <C> <51-75> 76. The basic sweep time, which was selected by the user, is 25 milliseconds 78.

Figure 8A:
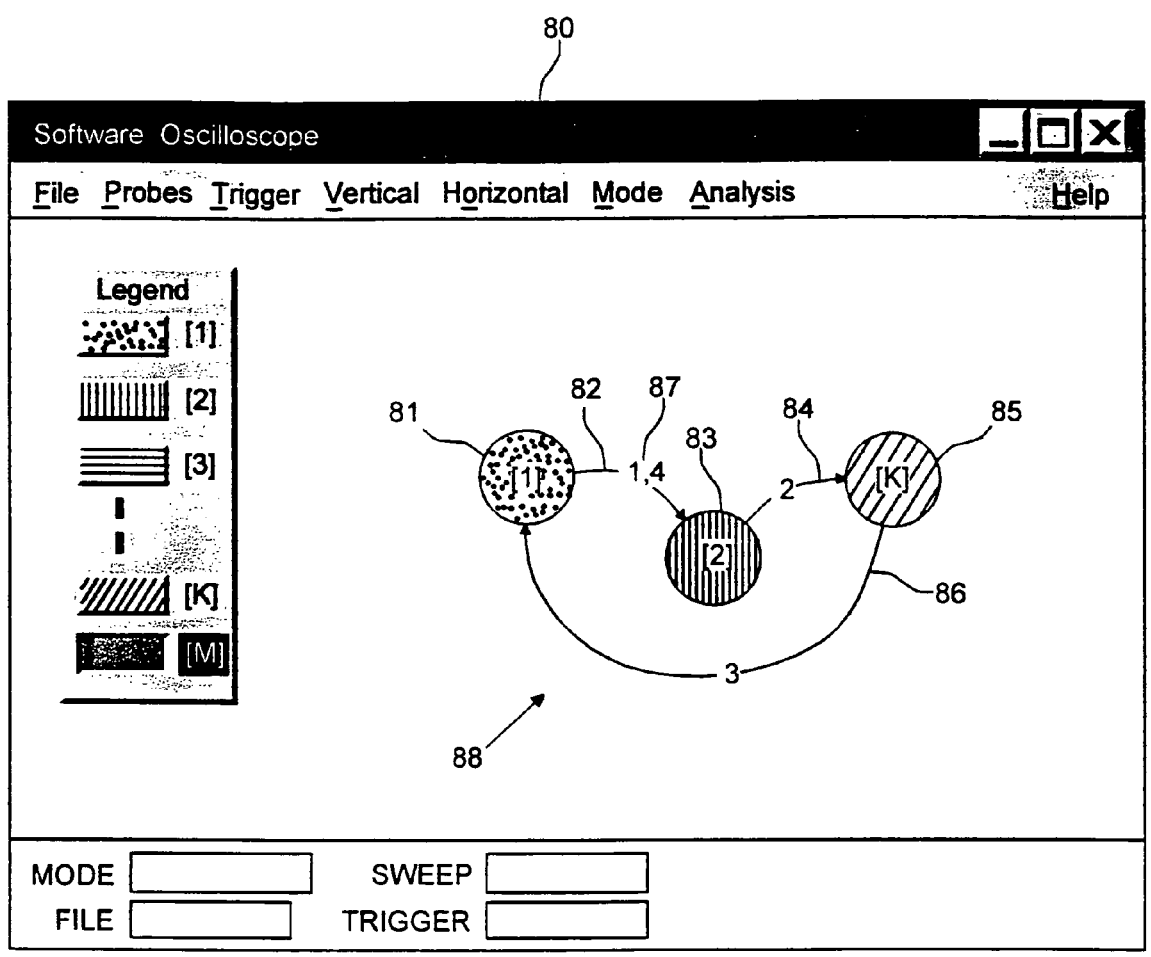
FIG. 8a is a diagrammatic illustration showing another approach to displaying code execution. Relationships and sequences are more readily seen. In this version, bubbles represent code blocks. The digits represent the sequential transitions among the bubbles. In this example, the code execution sequence is 1, 2, 3, and 4.

With reference to FIG. 8a, still another one of many ways of displaying data is shown at 80. This particular method is called the Discovery display method. The progression of code execution is unfamiliar and discoveries are made at each step. The complete bubble diagram 88 represents the completion of steps as they are shown in FIGS. 8b, 8c, 8d, and 8e. In those figures, time T4 is later than T3. Time T3 is later than T2, and time T2 is later than time T1.

Figure 8B:
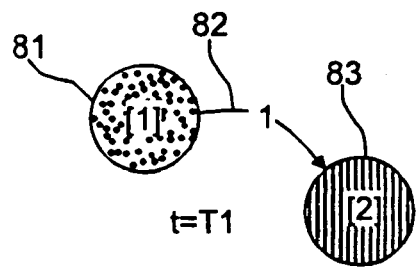
FIG. 8b is a diagrammatic illustration showing the first code block [1] to execute, followed by the execution of code block [2].

With reference to FIG. 8b, at time T1, code block [1] 81 has started and finished execution, and then code block [2] 83 has started and finished execution. The sequence is indicated by the line and arrow 82 showing the order in time. The digit 1 in that same line 82 indicates that this is the first in a series of transitions.

Figure 8C:
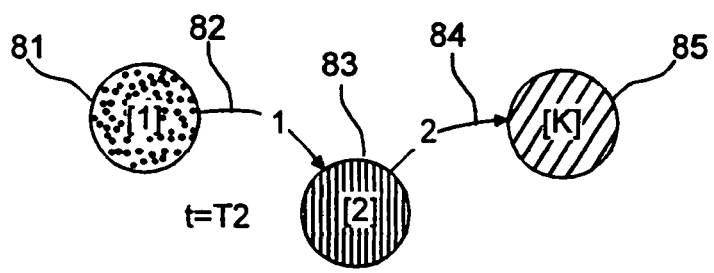
FIG. 8c is a diagrammatic illustration showing the appearance of the execution of code block [K], which occurs next as time progresses.

With reference to FIG. 8c, at time T2, code block [K] 85 has started and finished execution. The sequence is indicated by the line and arrow 84 showing the order in time. The digit 2 in that same line 84 indicates that this is the second in a series of transitions.

Figure 8D:
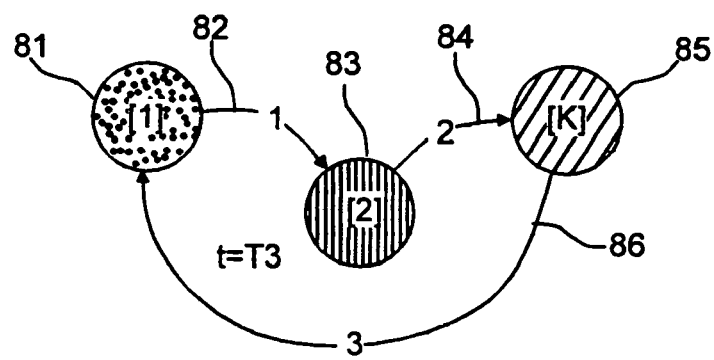
FIG. 8d is a diagrammatic illustration showing the appearance of the second execution of code block [1], which occurs next as time progresses.

With reference to FIG. 8d, at time T3, code block [1] 81 has again started and finished execution. The sequence is indicated by the line and arrow 86 showing the order in time. The digit 3 in that same line 86 indicates that this is the third in a series of transitions.

Figure 8E:
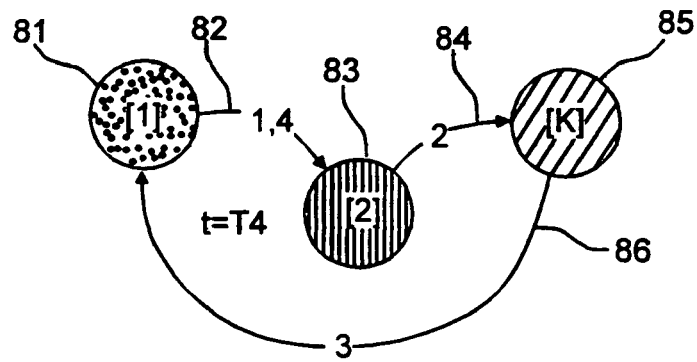
FIG. 8e is a diagrammatic illustration showing the second execution of code block [2], which occurs next as time progresses. The sequence numbers 1,4 indicate the order in which these executions (bubbles) occurred.

With reference to FIG. 8e, at time T4, code block [2] 83 has started and finished execution. The sequence is indicated by the line and arrow 82 showing the order in time. The digits 1,4 in that same line 82 indicate that a second transition occurred and it was number 4 in a series of transitions.

Figure 8F:
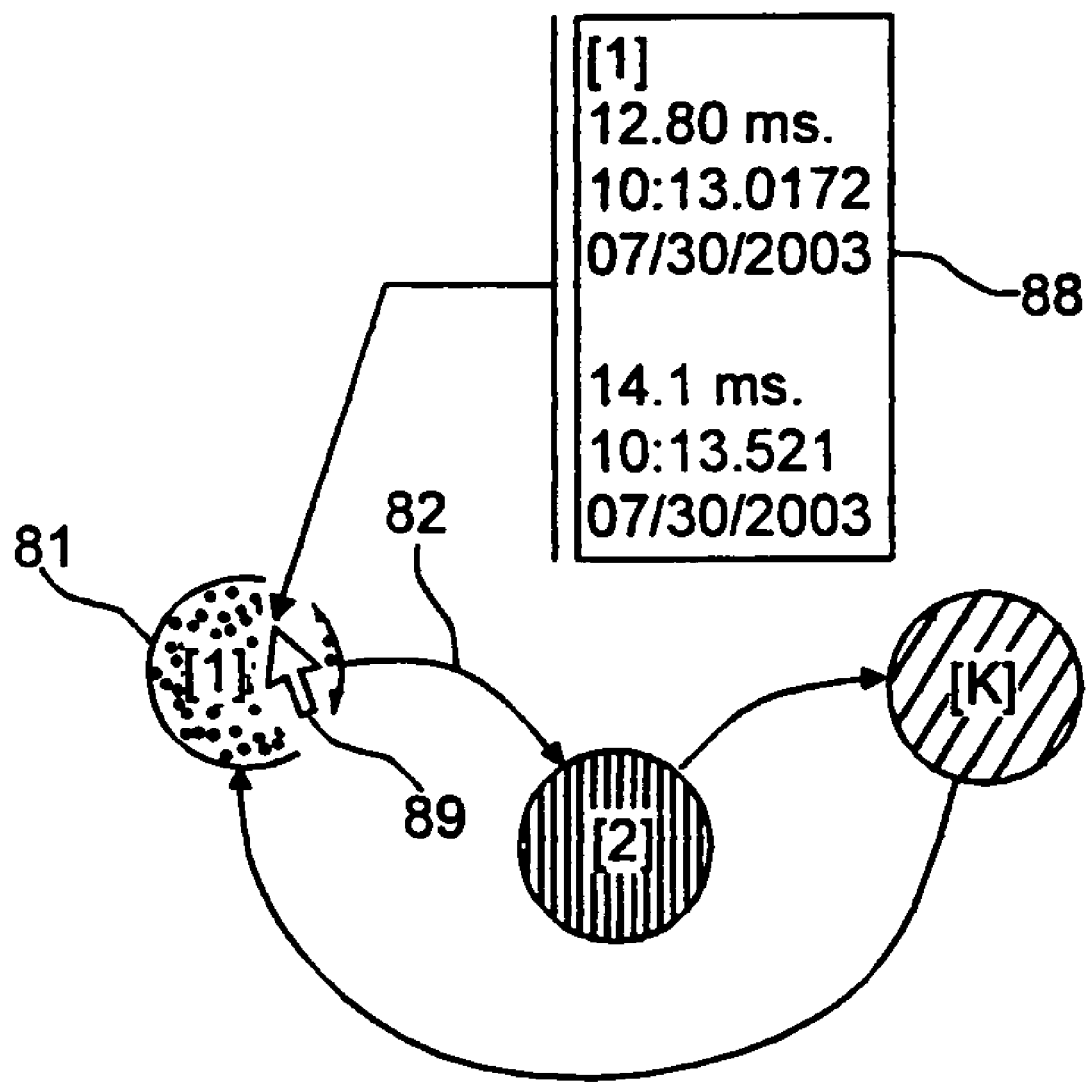
FIG. 8f is a diagrammatic illustration showing the smart mouse pointer which, when placed over a bubble, may be used to display a pop-up box containing data associated with that code block.

With reference to FIG. 8f, many details of the Discovery diagram from FIG. 8a are omitted here. By moving the mouse pointer arrow 89 over the selected bubble 81, details of the code block executions are displayed. The pop up box 88 shows that this is code block [1] data. The first time this code block executed the duration was 12.80 milliseconds. The start of execution was 10:13 and 17.2 milliseconds on Jul. 30, 2003. The second time this block of code executed was at 10:13 and 521 milliseconds on Jul. 30, 2003. It took 14.1 milliseconds to execute.

Figure 9A:
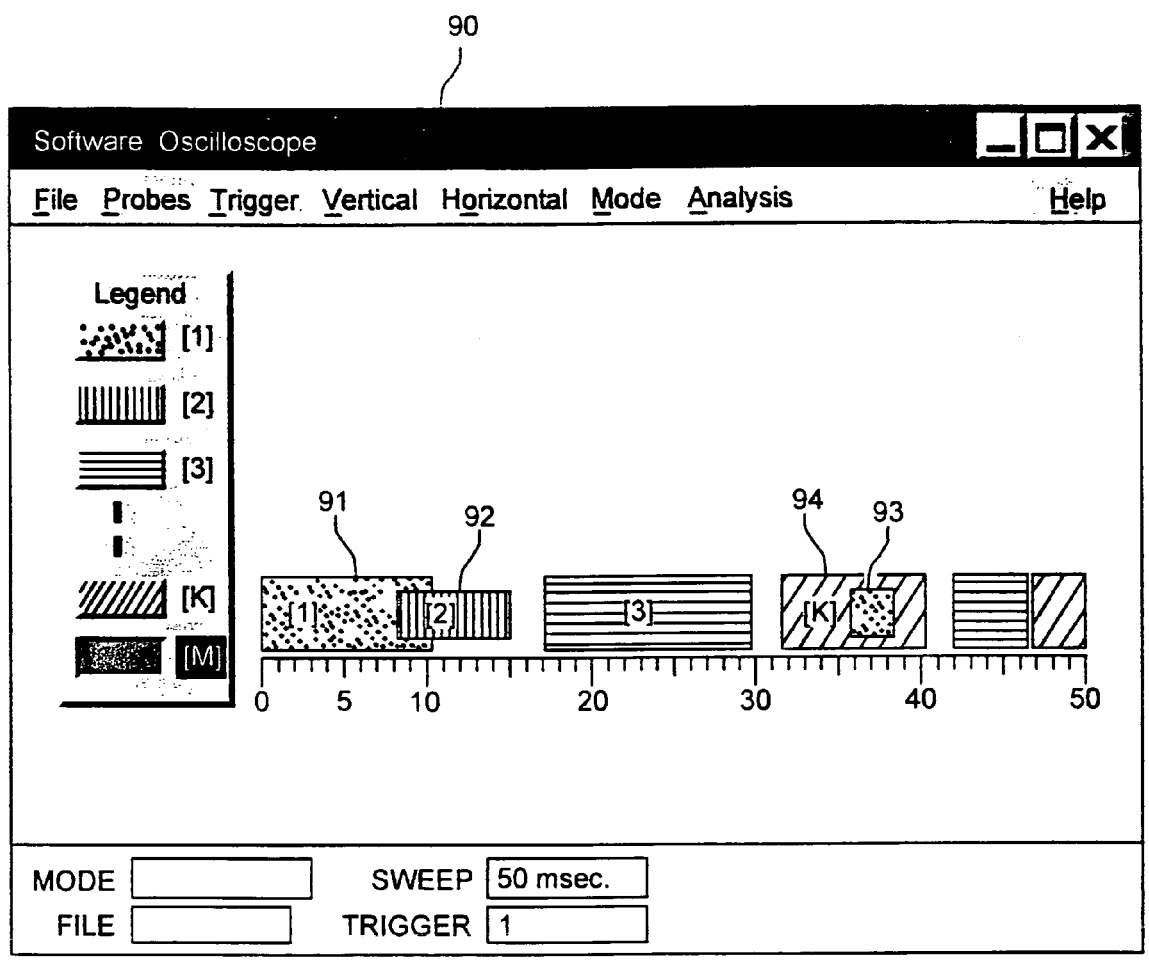
FIG. 9a is a diagrammatic illustration showing how this invention displays a second block of code that starts to execute before a first block completes its execution. This overlap is shown by displaying the overlapping block as a smaller block.

With reference to FIG. 9a, sometimes a first block of code starts execution and then a second block starts execution before the first is finished. One of many ways to display this is shown in the window 90. Code block [1] 91 has started execution. Some time later, code block [2] 92 starts execution. The nesting of a smaller block within the still executing larger block indicates this overlap. In this way, the finish of execution of code block [1] is still visible. A third block of code overlapping would be displayed as a still smaller block. Later in that same display, code block [1] 93 also starts and finishes execution all during the execution time of code block [K] 94. This overlap is also displayed by displaying the overlapping block as a smaller block. This method of displaying overlapping code also applies to the Waterfall display and the River display methods.

Figure 9B:
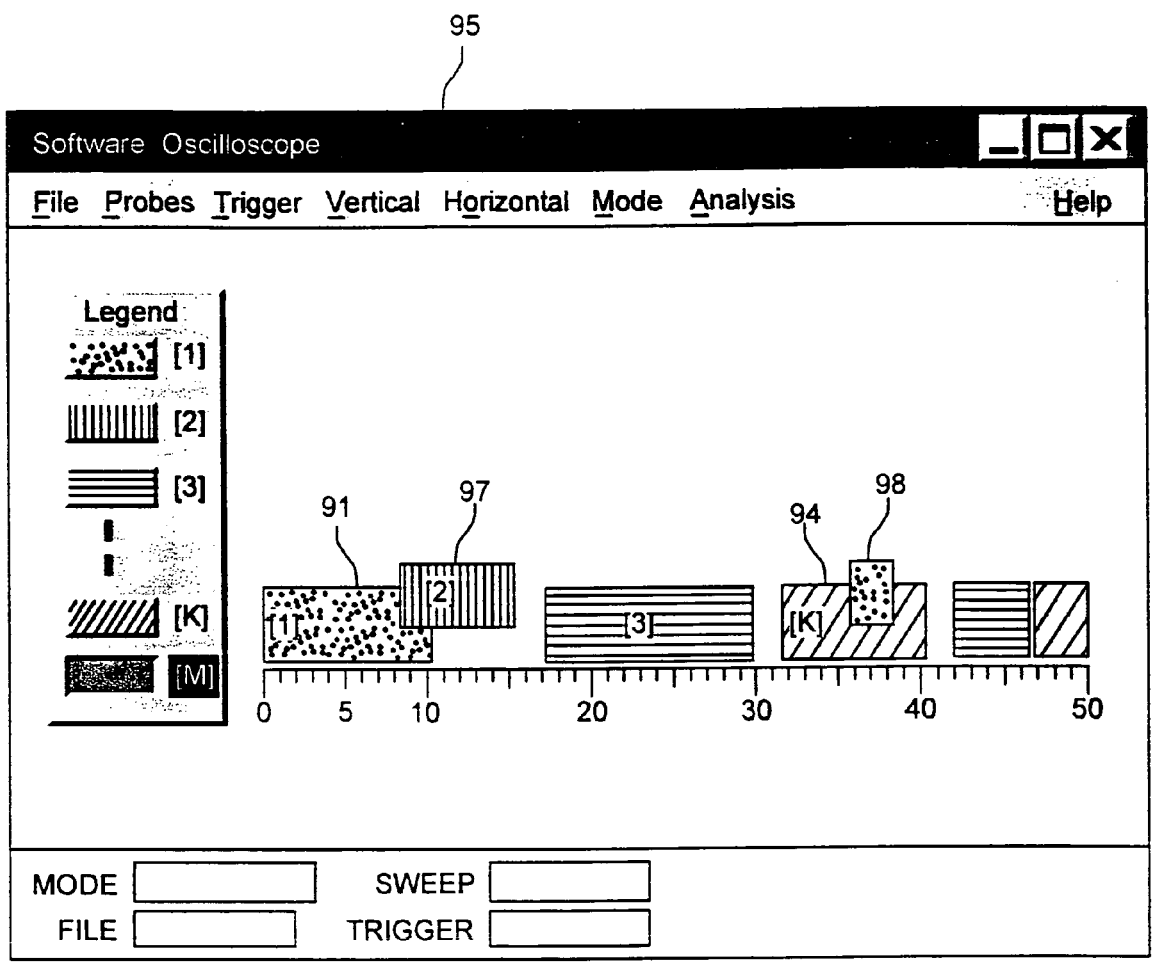
FIG. 9b is a diagrammatic illustration showing an alternate approach for displaying a second block of code that starts to execute before a first block completes its execution. Overlap in this case is shown by vertically shifting the bars.

With reference to FIG. 9b, another of many ways to display the overlap of code execution times is shown in the window 95. Code block [1] 91 has started execution. Some time later, code block [2] 97 starts execution. Shifting the block representing code block [2] vertically indicates this overlap. In this way, the finish of execution of code block [1] is still visible. A third overlap of code execution would be displayed by another shift vertically. Later in that same display, code block [1] 98 also starts and finishes execution all during the execution time of code block [K] 94. This overlap is also displayed by shifting vertically. This method of displaying overlapping code also applies to the Waterfall display and the River display methods.

Figure 10:
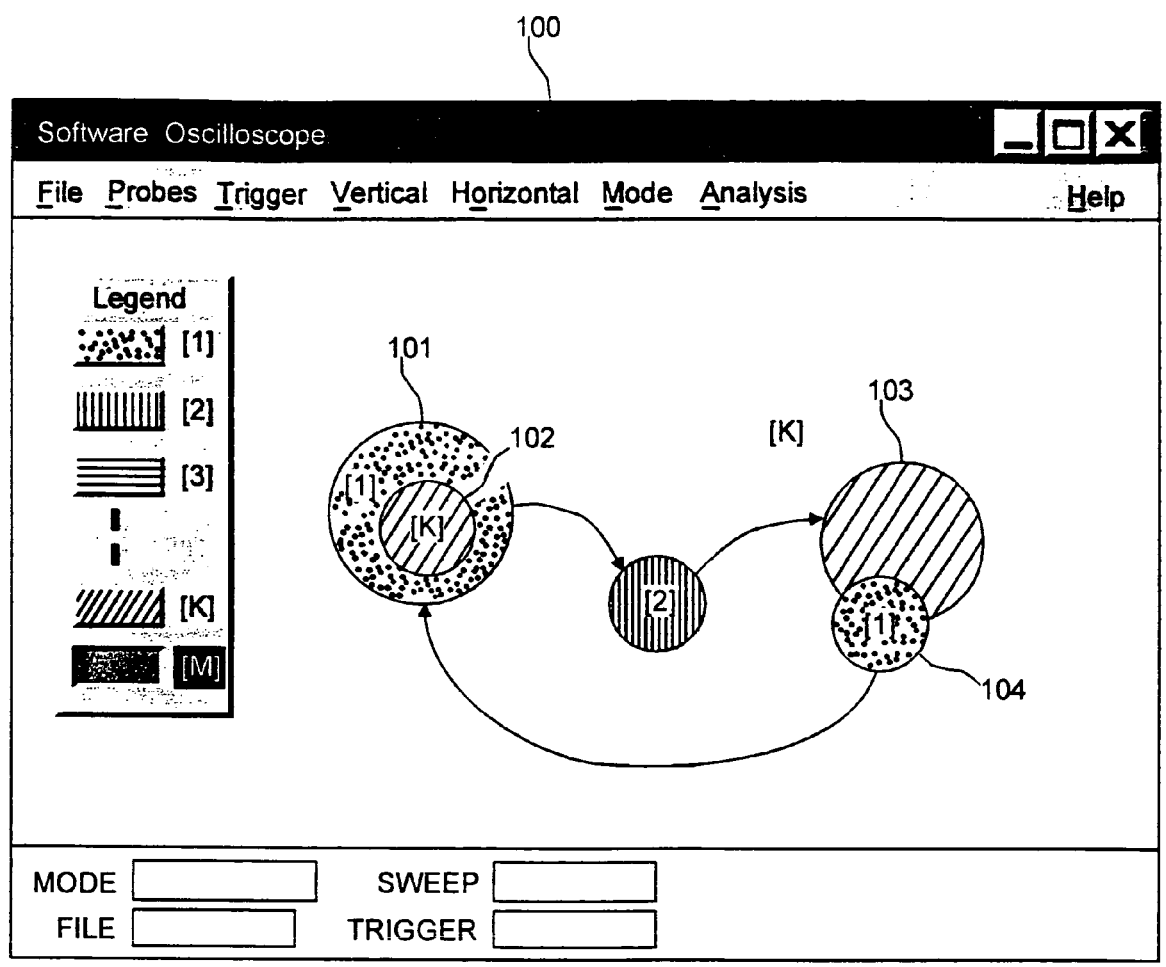
FIG. 10 is a diagrammatic illustration showing another alternate approach for displaying a second block of code that starts to execute before a first block completes its execution when bubbles are used to show code execution.

With reference to FIG. 10, the case of code overlapping is handled by using smaller bubbles to display the overlapping code. This is shown in the window 100. For example, code block [K] 102 starts and finishes code execution after code block [1] 101 starts execution. Later in time, code block [K] 103 starts execution. Before code block K 103 finishes, code block [1] 104 begins executing. Then code block [K] finishes execution. Then code block [1] finishes execution.

Figure 11:
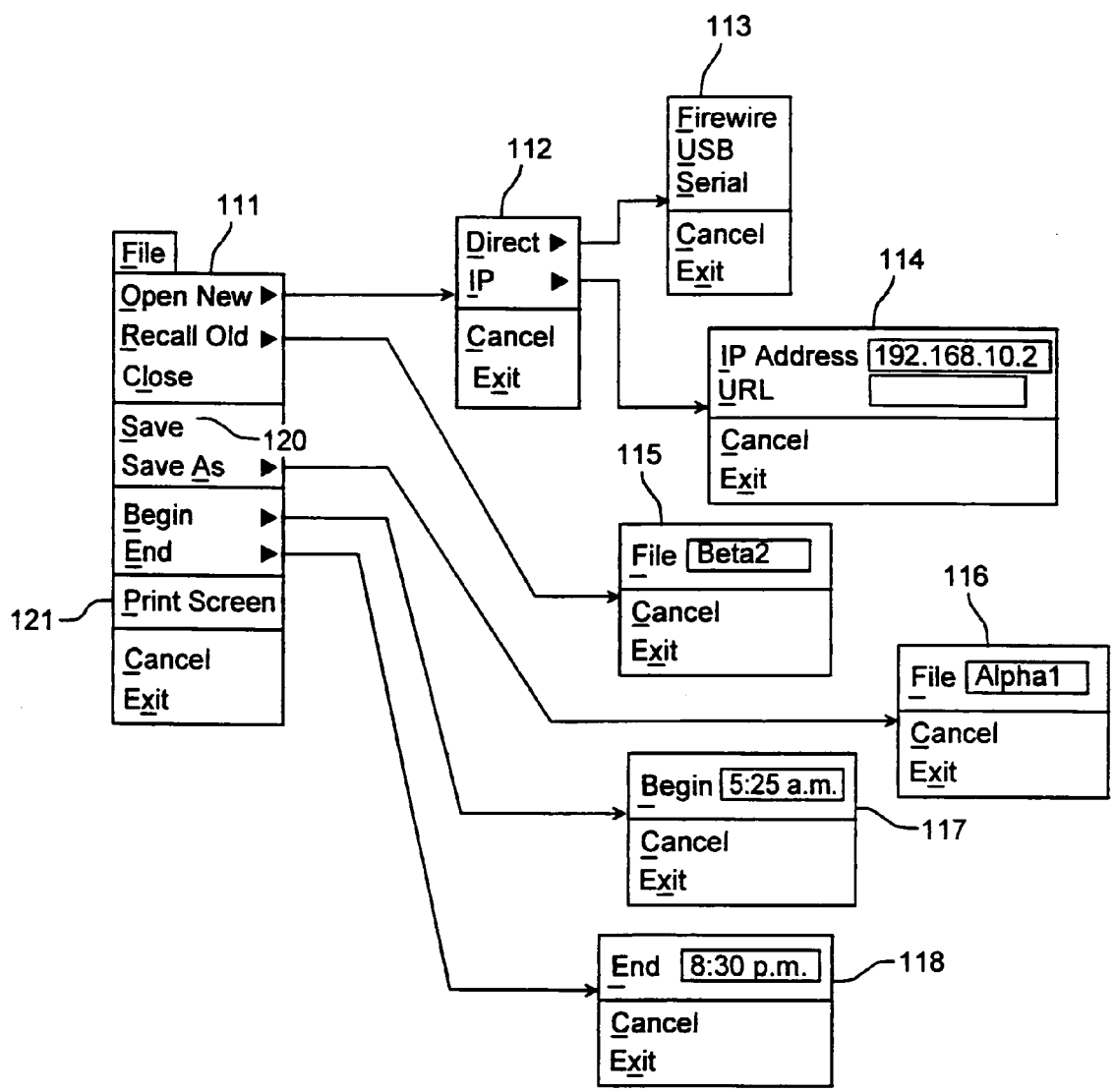
FIG. 11 is a diagrammatic illustration showing a pull down menu offering data file management features as well as offering connection to target options and automatic start and end time options.

With reference to FIG. 11, pull down menus 111 allow setting up a connection as either a direct 112 physical (local) or a remote connection (Internet or wireless). The direct 113 connections can be, but not limited to, a direct serial connection, a Universal Serial Bus (USB) connection or a Firewire (IEEE 1394) connection. The IP connections 114 can be to any device with an Internet Protocol (IP) address or a Uniform Resource Locator (URL) address. This includes target hardware local as well as connected to the Internet. This also includes target hardware connected over a virtual circuit such as a radio link to another planet. The Recall Old menu item in File 111 pull down menu provides for viewing a previously recorded file. A previously recorded file Beta2 115 can be loaded for viewing in this example. The Begin 47 menu provides the ability to automatically begin recording data from a target system at a predetermined time and date. The End 118 menu provides the ability to stop recording data at a predetermined time and date. The Save As menu item 116 provides for naming the data file to any desired name. The Save 120 menu item stores data to a default file name. In this example, the file name assigned is Alpha1 which is designated at element number 116. The Print Screen 121 menu item sends the current data being viewed on the software oscilloscope screen to the printer for a hard copy of what is currently displayed.

Figure 12:
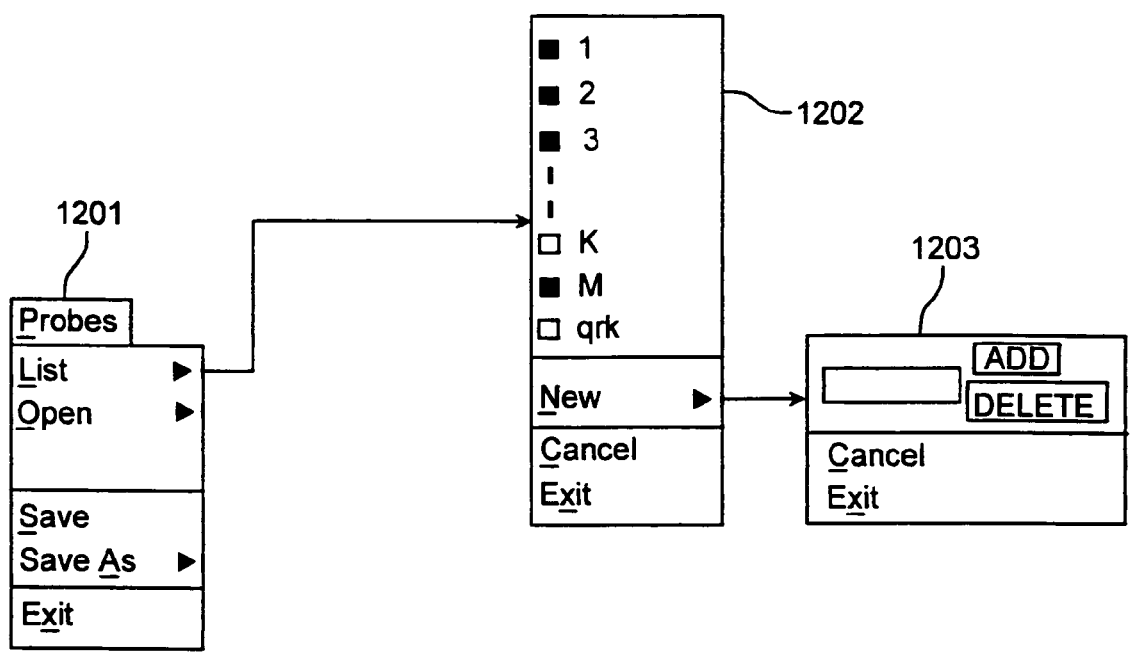
FIG. 12 is a diagrammatic illustration showing a pull down menu offering probe (code block) management features.

With reference to FIG. 12, the Probes pull down menu 1201 provides management of the code blocks to be viewed. Called probes, the List 1202 item displays all of the code blocks that have been observed, if viewing a previously recorded data file. If this is the first time data will be collected, then probe names (code block i.d.) using New 1203 need to be entered manually. Probe names can also be deleted from the list.

Figure 13:
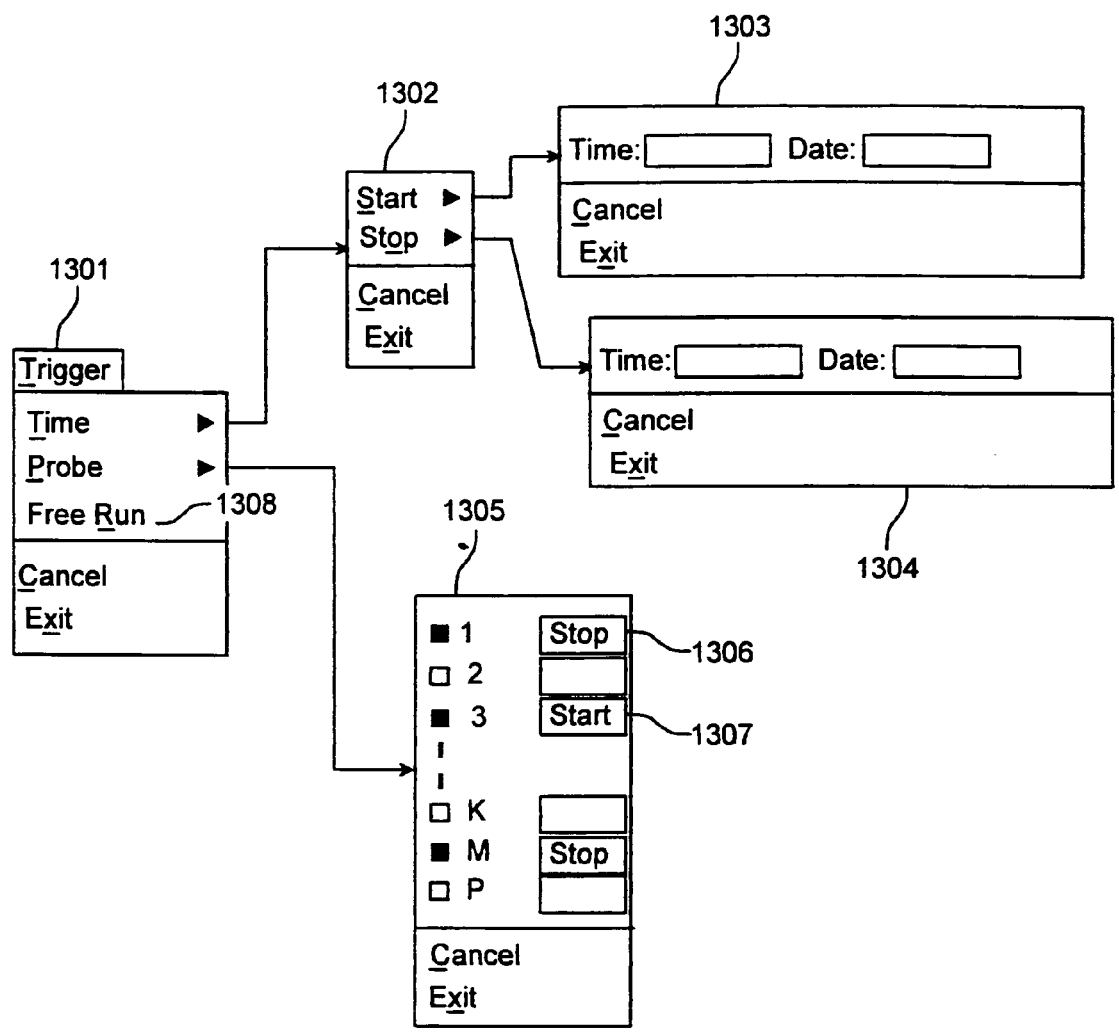
FIG. 13 is a diagrammatic illustration showing a pull down menu offering event trigger and probe trigger management features.

With reference to FIG. 13, the trigger 1301 pull down menu offers triggering options for viewing data. The Start/Stop time item 1302 provides for starting the viewing at a predetermined start time and date 1303. The Stop/Stop time item 1302 also provides for stopping the viewing at a predetermined stop time and date 1304. The Trigger/Probe 1301 menu displays a list (obtained from either previously captured data or from a manual entry) of probes that can be used for triggering purposes. The filled in blocks 1305 indicate selected probes. After being selected, that probe can be called to act as a starting point 1307 for the display, or a stopping point 1306. Triggering will act on any and all of the selections. A RESUME button on the display starts the display back up after reaching one of these stop triggers.

The Trigger/Free Run selection 1308 removes all prior trigger settings.

Figure 14:
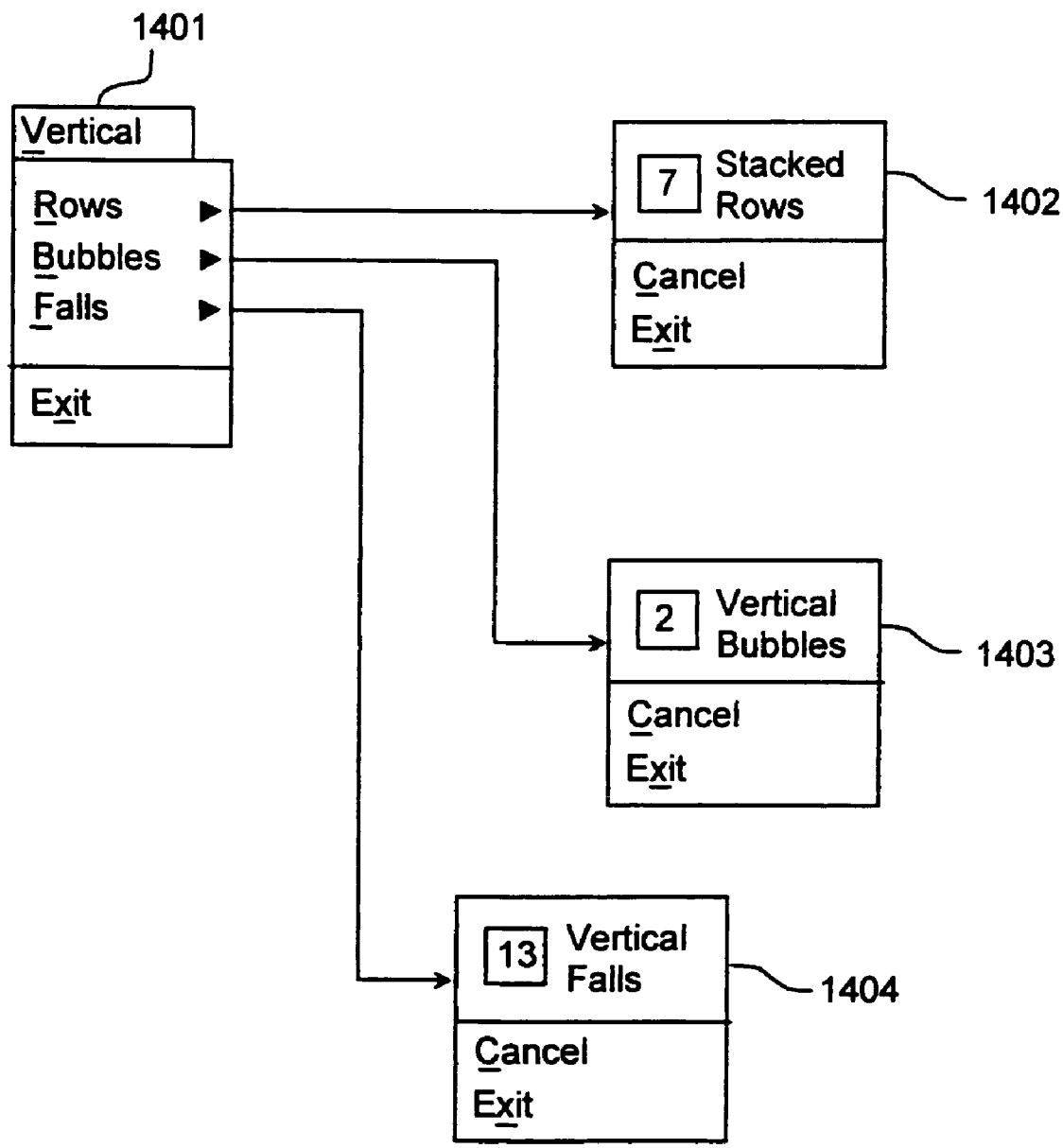
FIG. 14 is a diagrammatic illustration showing a pull down menu offering visual display density management features.

With reference to FIG. 14, the Vertical pull down menu 1401 displays a list of display density options. As more items are displayed on the screen, an upper limit is needed to keep the display viewable and uncluttered. For the Rows type display, the maximum number of rows is entered in the data box 1402. For the Bubbles (Discovery) type display, the maximum number of bubbles in the vertical direction is entered in the data box 1403. For the Waterfalls type display, the maximum number of vertical columns in the horizontal direction is entered in the data box 1404.

Figure 15:
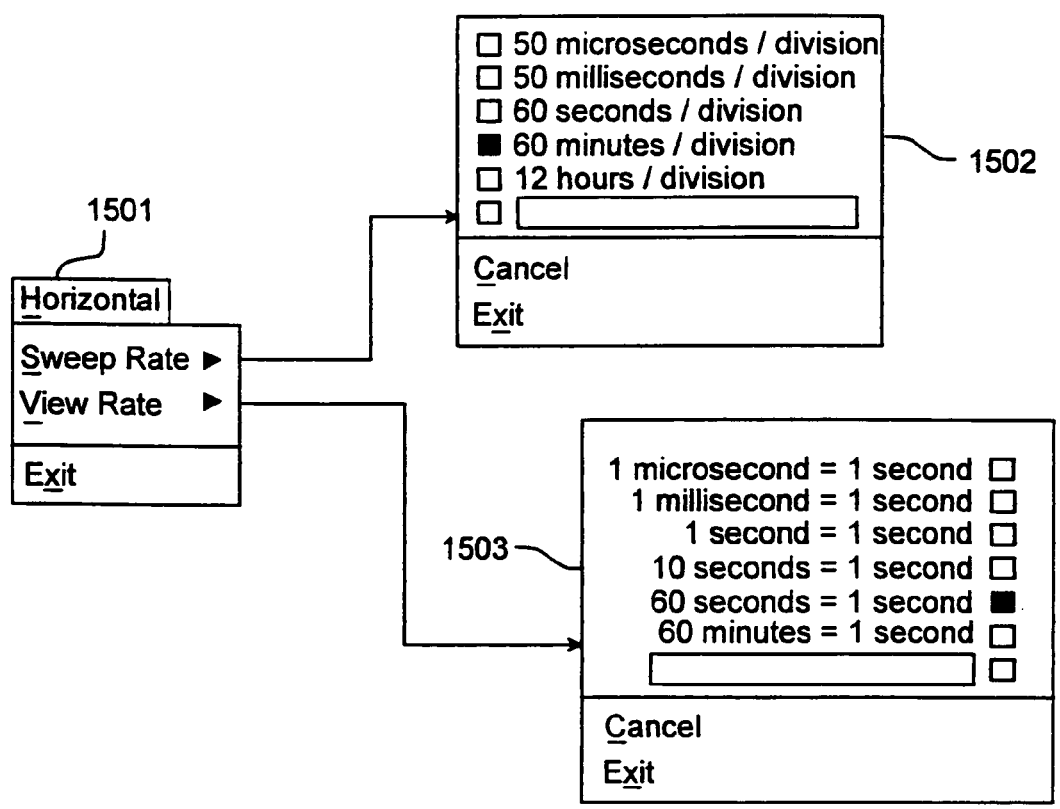
FIG. 15 is a diagrammatic illustration showing a pull down menu offering visual sweep rate and display rate management features.

With reference to FIG. 15, the Horizontal pull down menu 1501 displays a list of sweep rate and viewing rate options. The Sweep Rate selection 1502 determines how much time is displayed all at once on the display. The View Rate selection 1503 determines the speed of presenting data to the viewer. Much like a slide presentation where the rate sets how fast slides appear on the screen.

Figure 16:
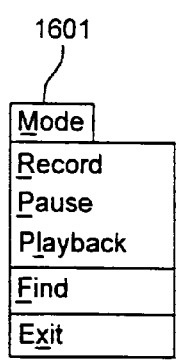
FIG. 16 is a diagrammatic illustration showing a pull down menu offering operating mode management features.

With reference to FIG. 16, the Mode pull down menu 1601 provides for setting up the observation of data to be real time (Record) or observed later (Playback). Any observation of real time data is automatically recorded in a data file.

Figure 17:
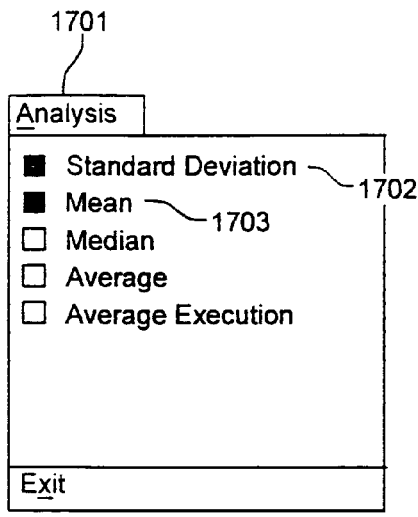
FIG. 17 is a diagrammatic illustration showing a pull down menu offering data analysis and mathematical function management features.
Figures 26A, 26B:
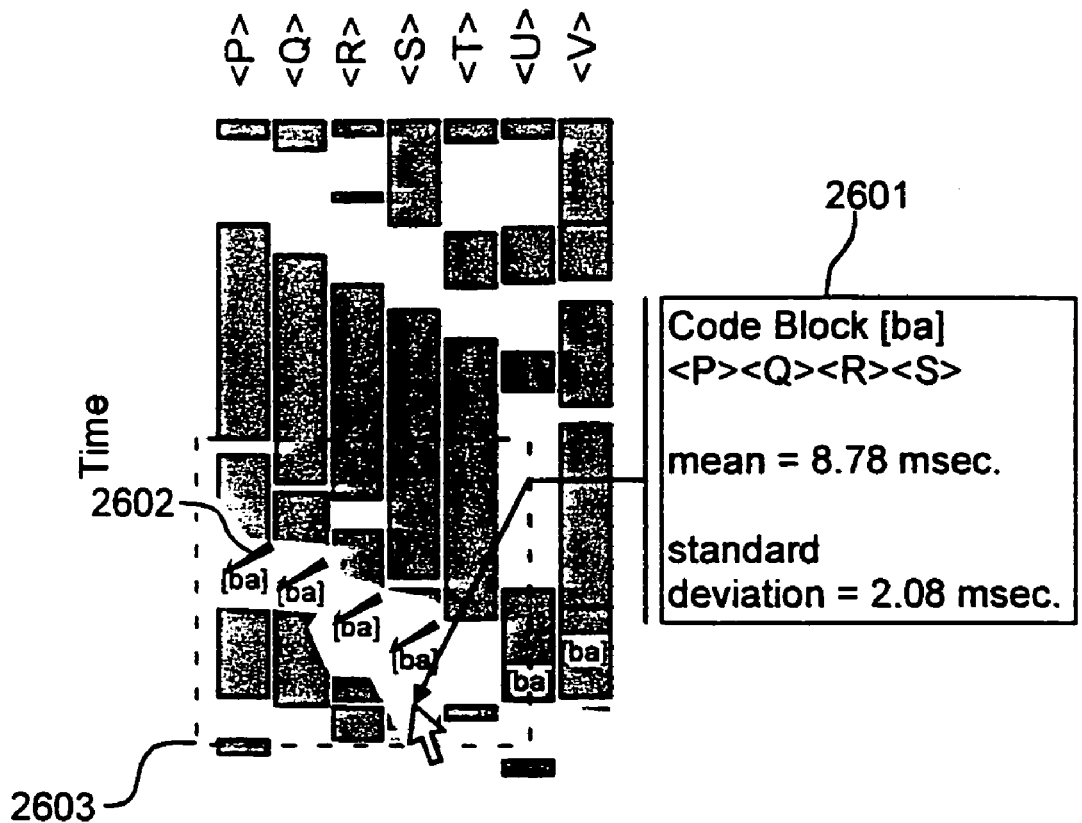
FIG. 26a is a diagrammatic illustration showing statistical tools that can be used on the displayed data. Specific code blocks are selected within a user-defined box for mathematical operations.
FIG. 26b shows the mathematical formula used in computing the mean value and the standard deviation value for the data in FIG. 26a. Obviously, many other mathematical functions, such as comparisons of code blocks to a standard value, and differences from a standard value can also be provided.

With reference to FIG. 17, the Analysis pull down menu 1701 offers a selection of mathematical operations to be performed on data. For example, Mean 1703 and Standard Deviation 1702 have been selected. When data is enclosed as shown in FIG. 26a, below, these operations will be performed on the enclosed data.

Figure 18:
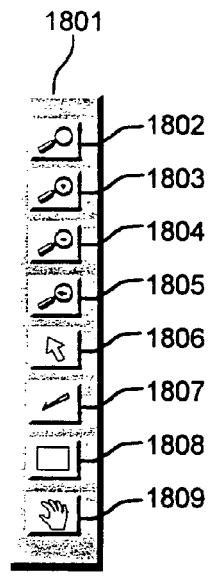
FIG. 18 is a diagrammatic illustration showing a menu containing screen-viewing aids such as zoom enlargement, zoom reduction, data selection and smart mouse pointer.

With reference to FIG. 18, the Tool Bar 1801 offers tools that are used to magnify, select and enclose data on the display. The button with the magnifier glass 1802 is used to enclose and then magnify a region. The button with the magnifier glass 1803 with a plus sign is used to enclose and then magnify a region. This is also called zooming in. The button with the magnifier glass 1804 with a minus sign is used to enclose and then shrink a region. This is also called zooming out. The button with the magnifier glass 1805 with an arrow is used to return to a previous view. This negates the just made zoom move. The button with the mouse pointer icon 1806 activates or deactivates the smart mouse pointer function. This allows the operator to suppress the pop-up data box. The button with the check mark icon 1807 selects or deselects data for mathematical analysis. The button with the box icon 1808 enables the enclosing of data on the display when moving and dragging the mouse pointer. This allows the operator to enclose data for mathematical analysis. The button with the hand icon 1809 enables the scrolling of displayed data. This allows the operator to step through in a vernier rather than fixed steps.

Figure 19:
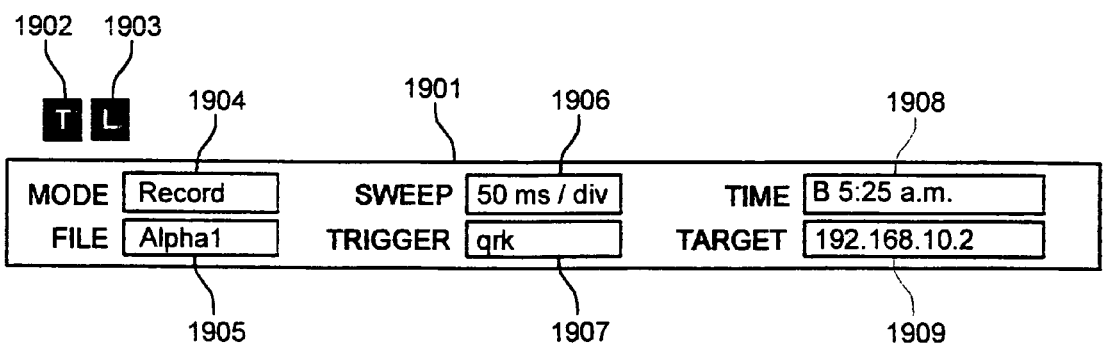
FIG. 19 is a diagrammatic illustration showing the information bar that displays some of the selections made by the user.

With reference to FIG. 19, the information bar 1901 displays some selections made by the operator. For example the record or playback mode is displayed in the MODE 1904 box. The File name is displayed in the FILE 1905 box. The selected sweep rate is displayed in the SWEEP 1906 box. The Trigger method or Trigger event is displayed in the TRIGGER 1907 box. The start time and end time are displayed in the TIME 1908 box. The hardware to be observed is identified in the TARGET 1909 box.

The Legend minimized 1903 appears as a small box, it is restored to fall size by clicking the mouse pointer over this box. The Tool Bar minimized 1902 appears as a small box. It is restored to full size, as shown in FIG. 18 above, by clicking the mouse pointer over this box.

Figure 20:
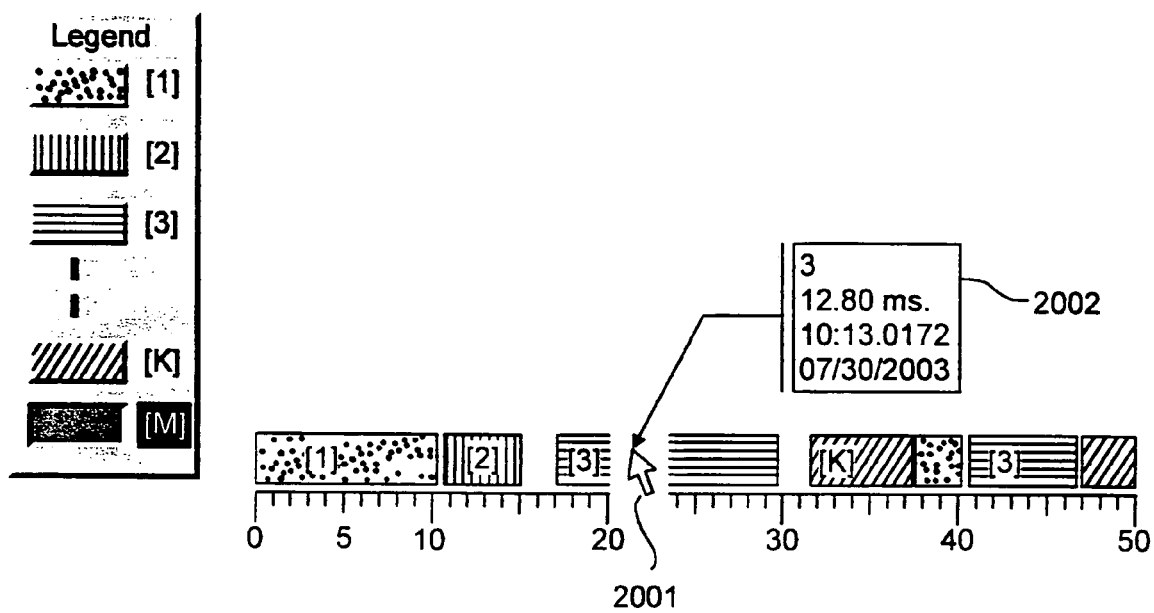
FIG. 20 is a diagrammatic illustration showing the smart mouse pointer used on the river display mode shown earlier in FIG. 5.

With reference to FIG. 20, the smart mouse pointer 2001 is shown placed over the display showing code block [3] execution. This action brings up the pop-up box 2002 that displays the data for that code block execution. For this example, the code block identity is [3]. The duration of code execution was 12.80 milliseconds. That particular execution started at 10:13 and 17.2 milliseconds on Jul. 30, 2003.

Figure 21:
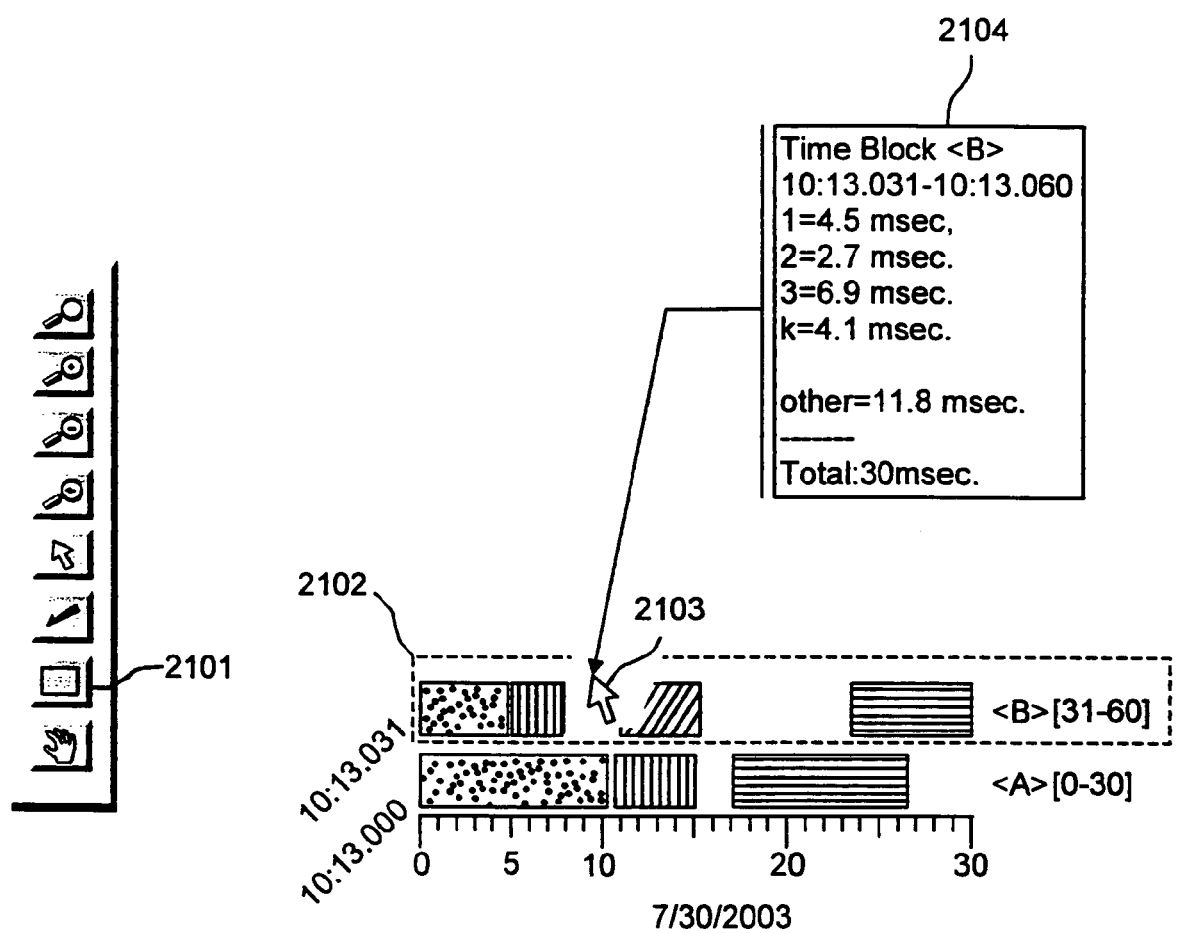
FIG. 21 is a diagrammatic illustration showing the smart mouse pointer displaying statistics for an enclosed group of code blocks. The user, selecting one of the tools available in FIG. 18 draws the box. Moving the smart mouse pointer into this box displays statistics for the entire enclosed period of time.

With reference to FIG. 21, a tool 2101 was used to enclose a region 2102 of the display thus enclosing several code blocks and gaps where no blocks were executing. These gaps could also exist because unknown code blocks are executing. Code blocks that do not report start of execution and finish of execution to the probe register are unknown to the software oscilloscope. By moving the smart mouse pointer into this box 2103, the pop-up box 2104 displays data and statistics for the enclosed region. The execution times for code blocks [1], [2], [3] and [K] are shown in this box. The total time available within that enclosed region is 30 milliseconds. That leaves 11.8 milliseconds of idle (other) time. This statistic is useful in deciding to add additional code to an existing product. If no idle time exists, then it would not make sense to incorporate additional code into the existing hardware. This is one of many applications for this invention.

Figure 22A:
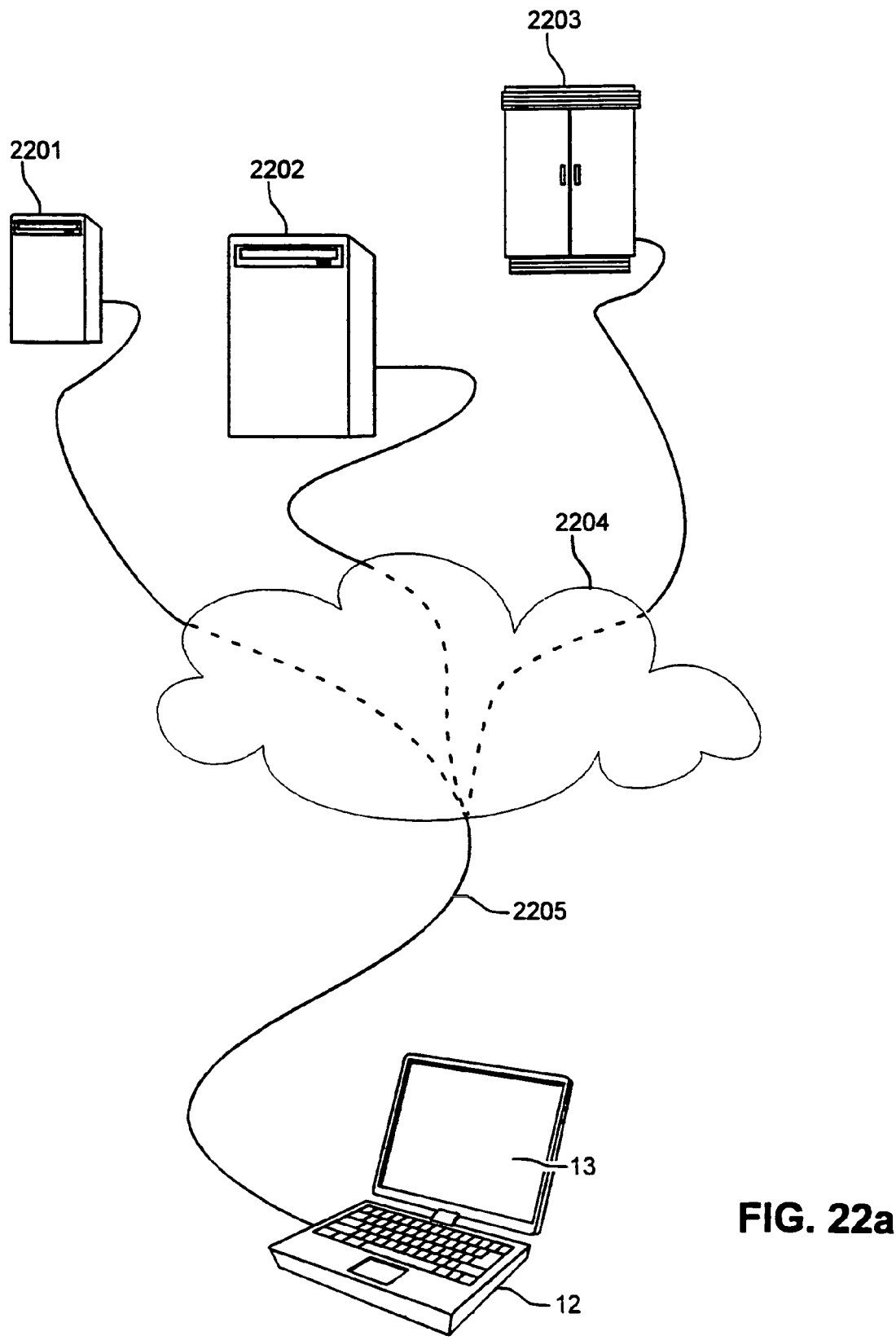
FIG. 22a is a diagrammatic illustration showing that the cable connection to the software oscilloscope may be a virtual connection. Various target hardware systems are shown connected via the Internet. Instantaneous readings or data files (for later viewing) from these target systems are downloaded to the laptop that is running the software oscilloscope program. In this way, the operation of target hardware systems can be observed from anywhere on the earth.

With reference to FIG. 22*a*, the software oscilloscope 12 can be connected to target hardware located anywhere else in the world. By using a virtual connection 2205 over the "Internet" 2204 different products 2201, 2202, 2203 located anywhere on earth can have their software execution displayed in real time on this software oscilloscope.

Figure 22B:
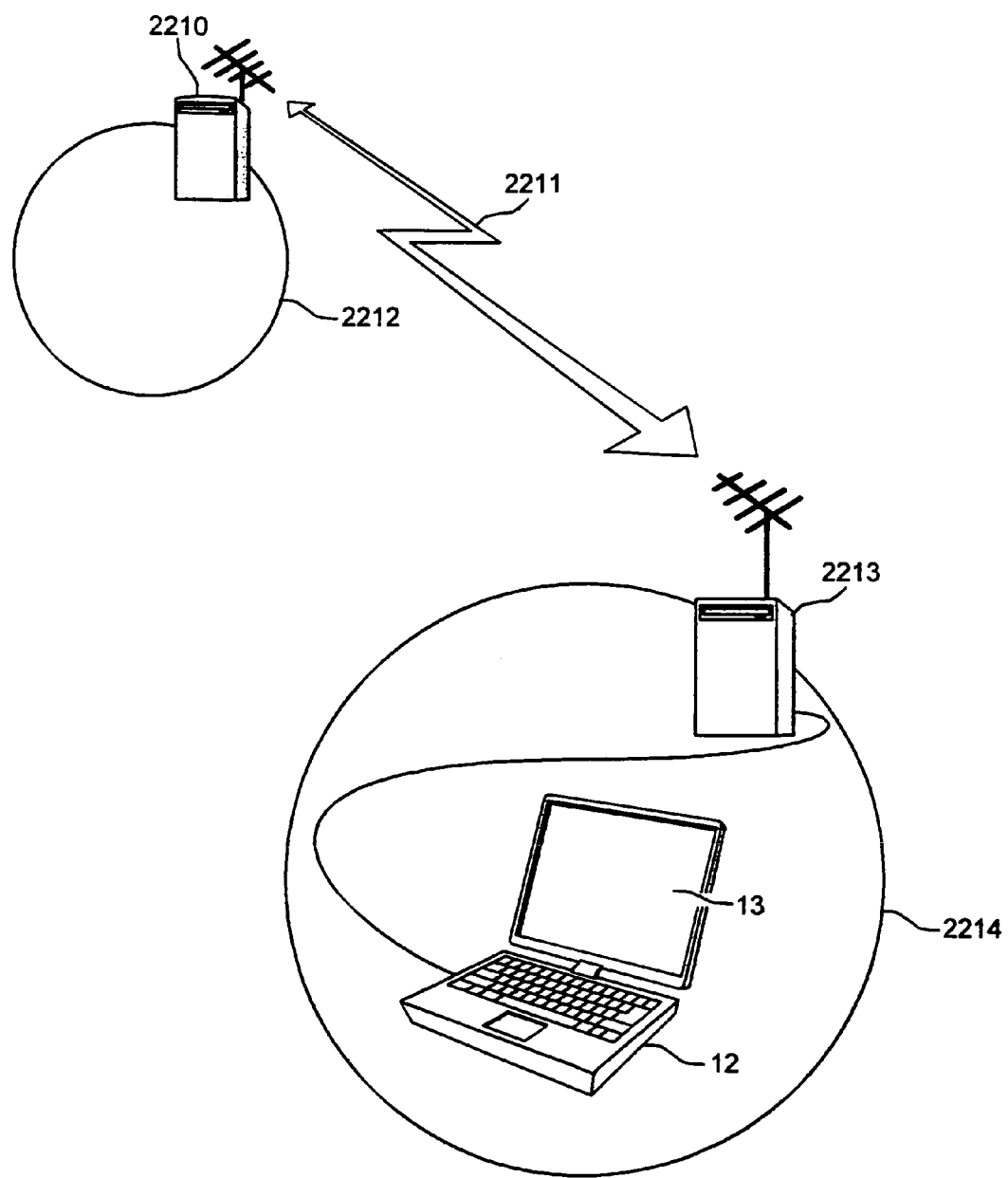
FIG. 22b is a diagrammatic illustration showing that the connection to the software oscilloscope may be a wireless virtual connection. A target hardware system is shown operating on another planet. In this manner, the operation of target hardware systems can be observed from anywhere off the earth.

With reference to FIG. 22*b*, the software oscilloscope 12 can be connected to target hardware located anywhere else outside this world. By using a virtual connection 2211 over a wireless link, target 2210, located anywhere on or off earth can have its software execution displayed in real time on this software oscilloscope. For example, Mars lander vehicles could be equipped with the software probes described herein. The software executing on the Mars lander (as target hardware) 2210 on Mars 2212 and controlling its movement on Mars is observed by sending data down to earth 2214 for observation in real time. Obviously allowing for the approximately 10 minute delay in signals reaching the earth, any software faults in operation of the Mars lander could be observed (almost in real time) directly.

Figure 23:
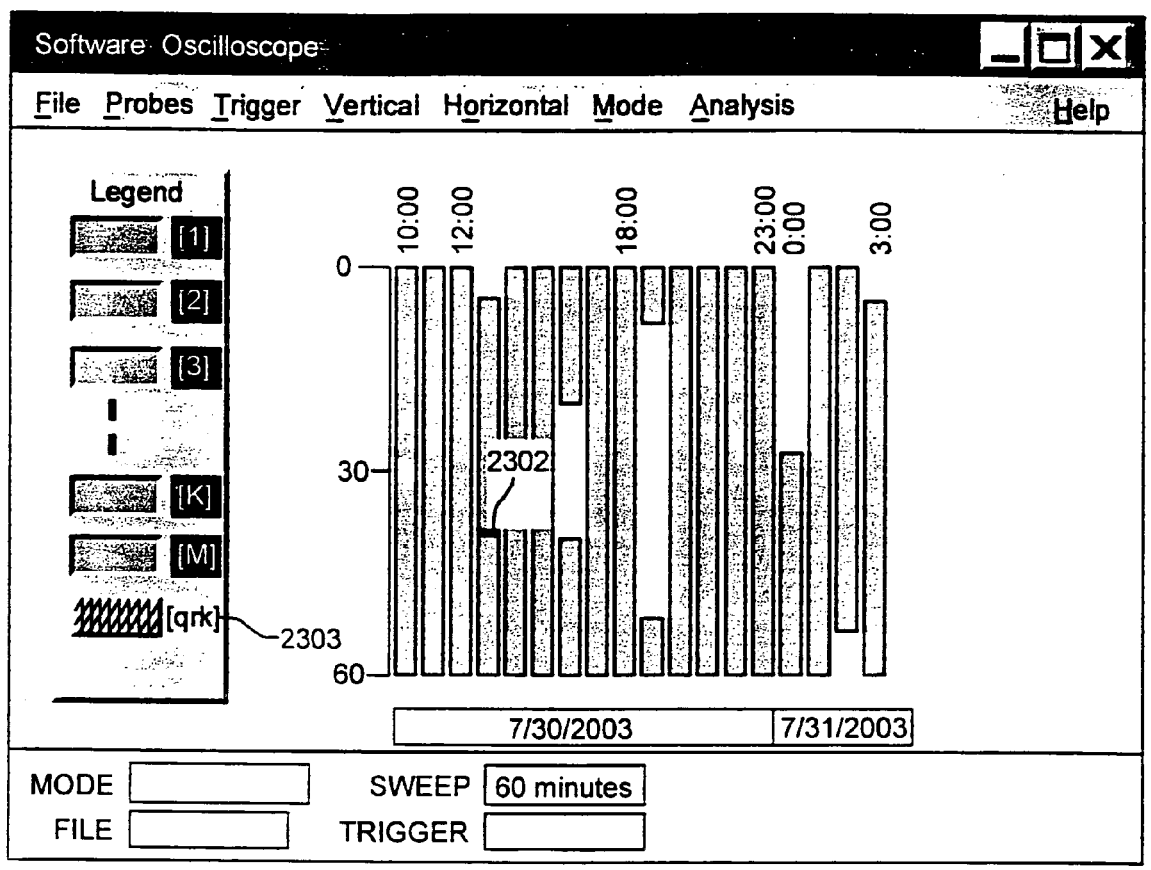
FIG. 23 is a diagrammatic illustration showing one application of the software oscilloscope invention. In this case, only one probe has been selected for viewing a single block of code. All other codes having probes connected will appear grayed out since it was not selected on the legend. The goal is to observe operation for a long time and capture any occurrence of this code executing.

With reference to FIG. 23, the display 2301 shows data that has been collected for several days running. The gray areas show unselected code executions. The fine details of code blocks executing in millisecond intervals cannot be distinguished on this display with a sweep rate of 60 minutes. In order to find a selected block of code, a simple display would not work. In this example, code block [qrk] is the only block 2303 selected. The only occurrence of this code block executing over the day and a half of operation is seen as a blinking box 2302. This blinking method points to a general location for the selected code block. Tools such as shown in FIG. 18 are then used to zoom in for a closer look. This approach avoids the need for long tedious manual searches through days worth of data. When the display scales are adjusted to the point where the code block can be viewed in correct proportion, then the blinking stops automatically.

Figure 24:
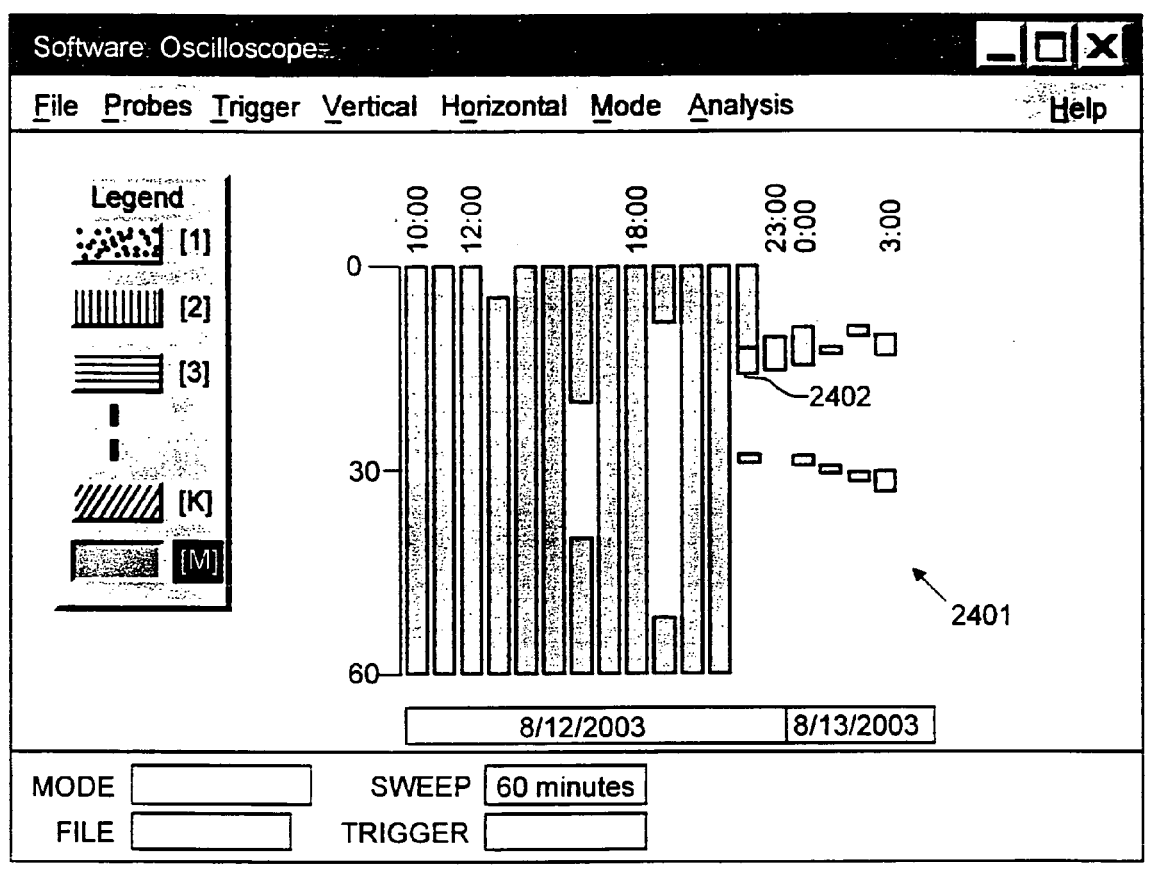
FIG. 24 is a diagrammatic illustration showing another application of the software oscilloscope invention. A target hardware computer has been "crashing" during operation. The crash reported by the target hardware user corresponds to the irregular code executions observed on the software oscilloscope display at about the same reported time. The smart mouse pointer can also be used to display statistics about that occurrence.

With reference to FIG. 24, the display 2401 shows data collected after a day and a half of running. The software oscilloscope has been recording code execution from 10:00 a.m. on Aug. 12, 2003 until 3:00 p.m. on Aug. 13, 2003. The person operating the target hardware reported that the system "crashed" somewhere around 11:00 p.m. on Aug. 12, 2003. The display shows what appears to be normal code execution for most of the day. The area after 10:00 p.m. does appear different. Specifically, one area 2402 suddenly is changed. This appears to correlate with the "crash". This invention provides crash data by recording what code blocks were operating before and after the crash. Further analysis using tools such as shown in FIG. 18 allow further investigation. Specific code blocks can be identified and studied. Testing based on suspected code blocks can lead to fixing the problem rather than writing patch code.

Figure 25:
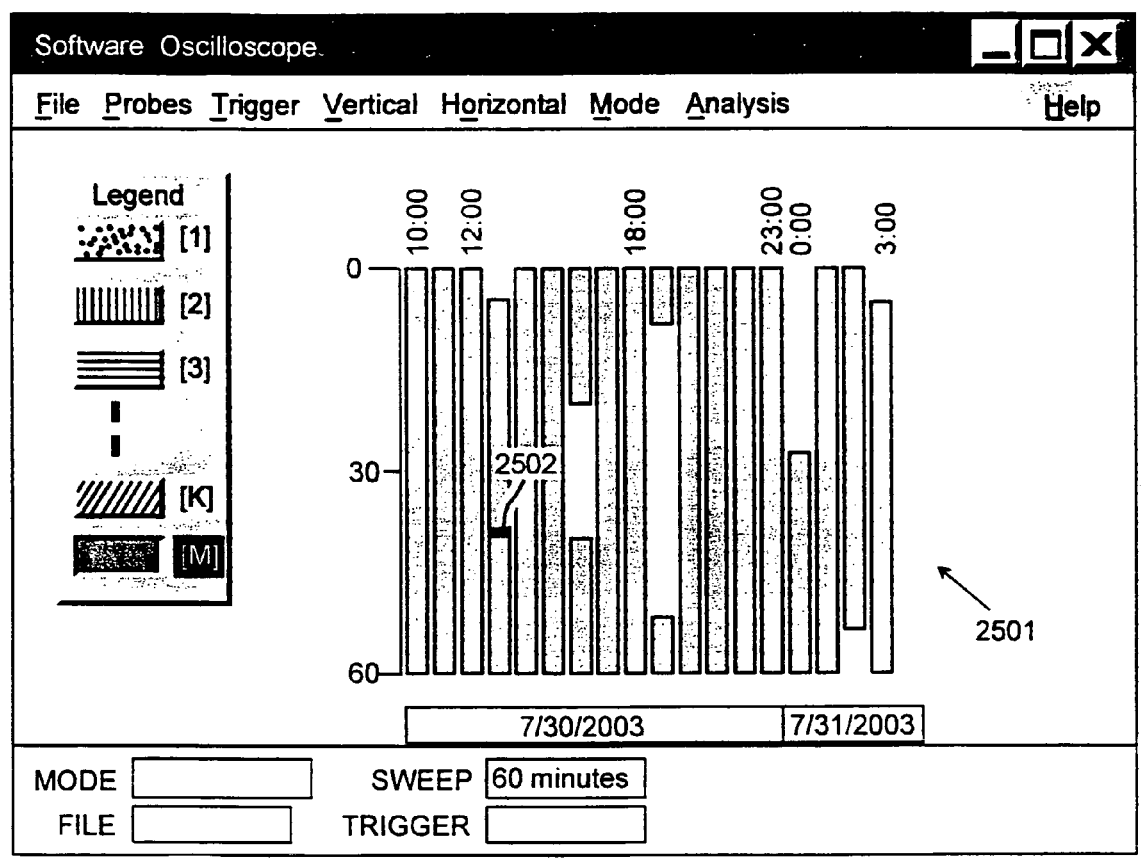
FIG. 25 is a diagrammatic illustration showing still another application of the software oscilloscope invention. A customer complaint was recorded at a specific time. A file that contains a record of the target hardware computer operation is retrieved and reviewed. Code blocks executing in that time frame can be investigated.

With reference to FIG. 25, the display 2501 shows data collected over a day and a half of running. The person operating the target hardware reported that the system seemed to be running "funny" somewhere around 1:30 p.m. on Jul. 30, 2003. The display shows what appears to be normal code execution for the entire period. Specifically, the area around the time of the complaint 2502 appears normal. Thus, a method of either confirming or denying software operation problems with customer complaints is demonstrated. Further analysis using tools such as shown in FIG. 18 allow further investigation. Specific code blocks can be identified and studied. Testing based on suspected code blocks can lead to fixing the problem rather than writing patch code. Not finding any software problems would indicate that a hardware or mechanical problem should now be looked for.

With reference to FIG. 26*a*, mathematical analysis can be performed on the data displayed on the software oscilloscope display. In this example, a box 2604 is drawn, using one of the tools shown in FIG. 18, enclosing data to be processed. Further, another of the tools shown in FIG. 18 is used to check the code blocks within that box to be processed. An example of the selection marker is shown at 2602 as selecting code block [ba]. Moving the smart mouse pointer into that box of enclosed data results in the pop-up box displaying the results of mathematical processing. In this example, the code blocks to be processed are identified as [ba] and are present in the time blocks <P>, <Q>, <R> and <S>. The mathematical functions, which were selected from the pull down menu in FIG. 17 were the mean function and the standard deviation function. In this example, the mean value 2601 for the length of code block execution times is calculated to be 8.78 milliseconds. The standard deviation 2601 calculated for those code block execution times is 2.08 milliseconds. Obviously, other code blocks can be enclosed in a box and other selections made within that box. Also, other mathematical operations can be performed on the selected code blocks. For example, the average of starting time could be computed. Also, the average of the finish times could also be computed.

With reference to FIG. 26*b*, the mathematical formula used in the calculation of the mean and the standard deviation values for the code blocks selected in FIG. 26*a* are shown here. Obviously, other mathematical formulae could also be offered.

Figure 27A:
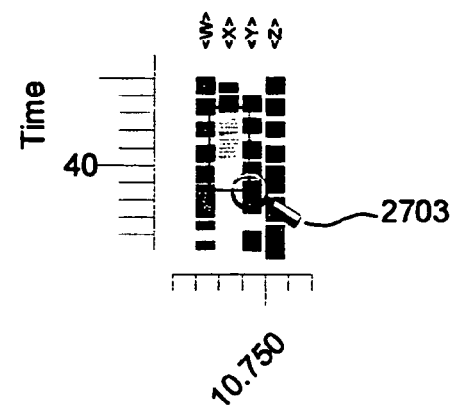
FIG. 27a is a diagrammatic illustration showing the operation of the zoom feature. The magnifier glass is selected from the options presented in FIG. 18.

With reference to FIG. 27*a*, due to the variations in code block execution times, a particular display time scale may show some in a viewable manner and others not. For instance, if some code blocks take seconds to operate and others only milliseconds, then no one time scale is suitable for viewing both. In that case, one of the tools available, as shown in FIG.

Figure 27B:
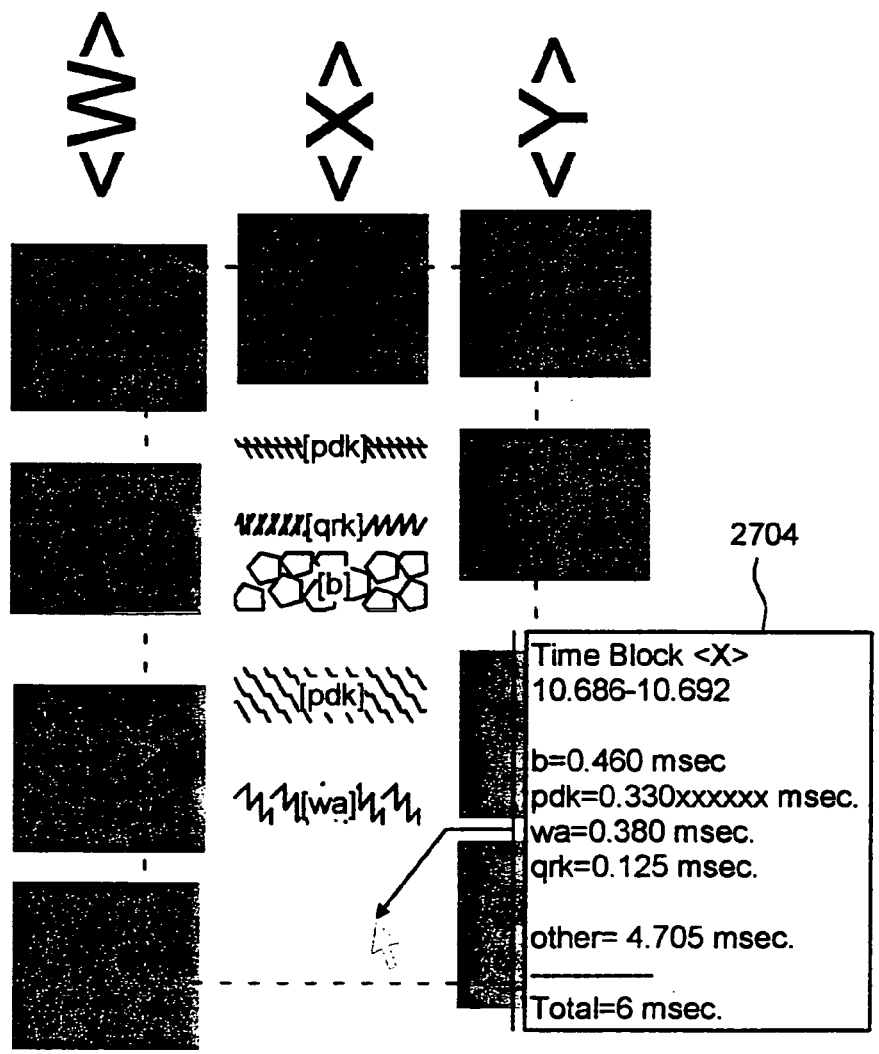
FIG. 27b is a diagrammatic illustration showing the operation of the zoom feature. The region selected in FIG. 27a is expanded. A smart mouse pointer moved into this region displays statistics about the enclosed region.

18 earlier, is the zoom tool. By enclosing an unreadable area with the magnifier tool 2703, a region can be expanded for closer viewing. Moving the smart mouse pointer (see FIG. 27*b*) into that region causes the pop-up box 2704 to display data about the code blocks enclosed in that box.

Figure 28A:
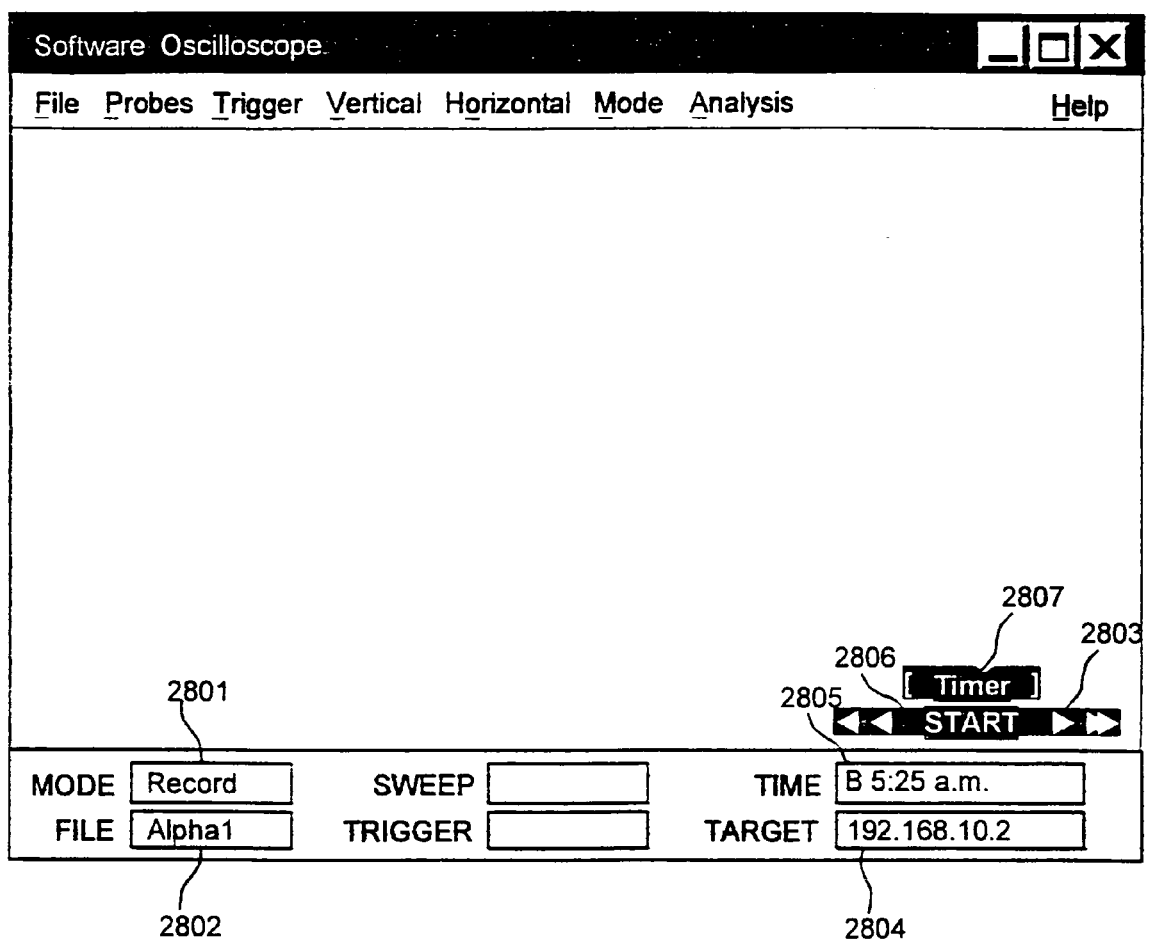
FIG. 28a is a diagrammatic illustration showing the software oscilloscope in preparation for observing real time code execution. The record mode is selected. The begin time has been entered. The software oscilloscope is armed and waiting.

With reference to FIG. 28*a*, the software oscilloscope screen is shown in stand-by mode. It is waiting the start recording and displaying code execution. The on screen text: Timer 2807 and the Mode text: Record 2801 indicate that the software oscilloscope is prepared to start observing real time code execution. In this example, this will begin automatically at 5:25 a.m. as shown in the TIME box 2805. The user sets this time in a pull down menu. As data is being recorded, it is also displayed. Any actions done to the display, such as interrupting the display, have no effect on the data being written to the file. The user selects the file name and in this example it is called Alpha1 2802. The target 2804 for observation in this example is reachable over a network at IP address 192.168.10.2. Obviously, all of these parameters are for illustration purposes and can be any value. The tool bar and the legend bar 2808 are shown minimized, leaving more room for data display. Recording could begin earlier if the START 2806 button is pushed. Pushed means the mouse pointer is moved over this on-screen switch and the mouse button is clicked once.

Figure 28B:
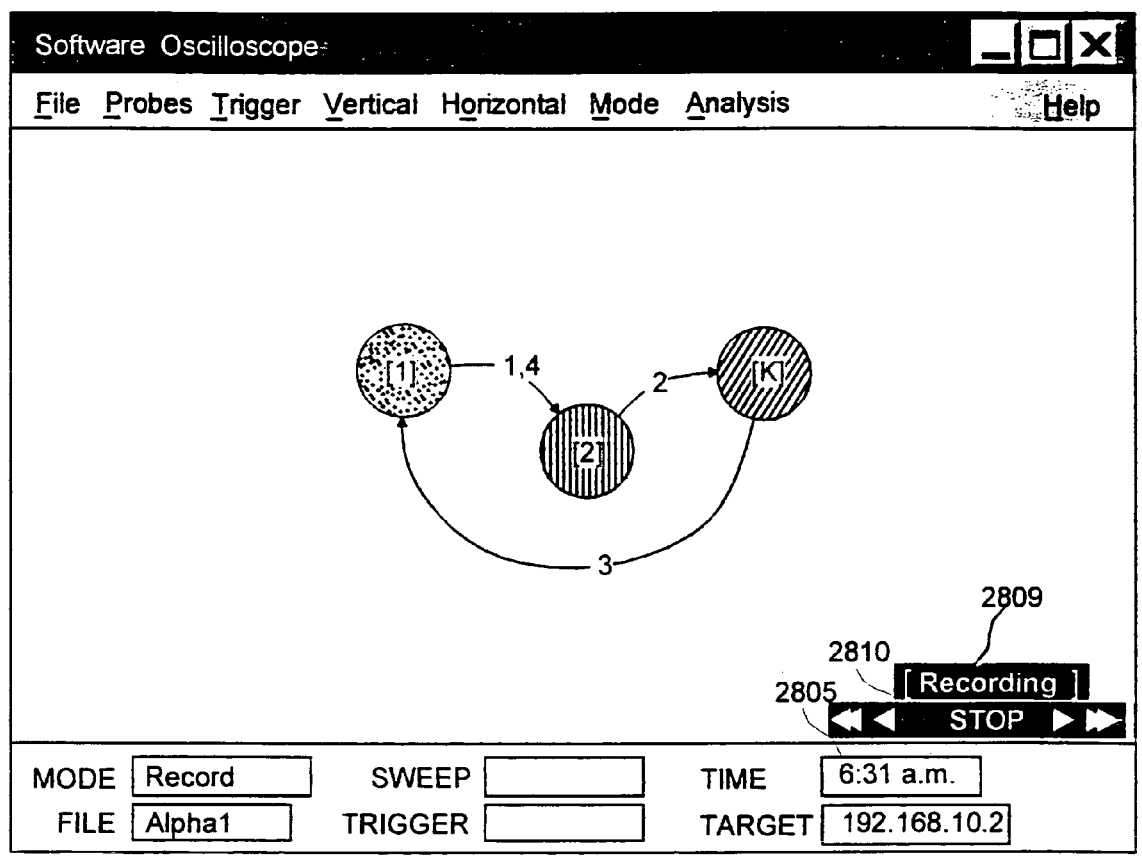
FIG. 28b is a diagrammatic illustration showing the software oscilloscope in operation. The display shows code executing on the target system.

With reference to FIG. 28*b*, the software oscilloscope screen is recording 2809 and displaying code execution. Pushing the STOP 2810 button would stop the display from changing. However, writing data to the file would continue uninterrupted. The TIME 2805 box shows the time associated with the current on screen code execution.

Figure 28C:
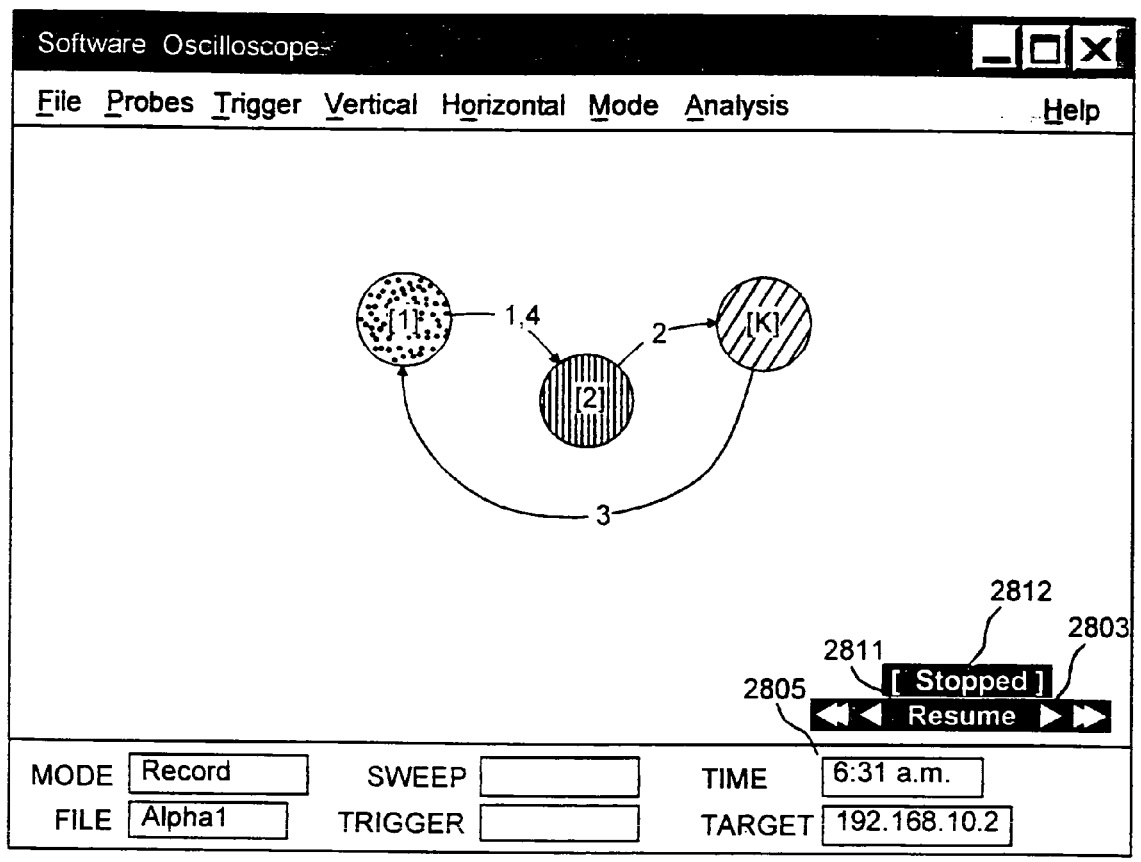
FIG. 28c is a diagrammatic illustration showing the software oscilloscope with the display stopped. Data collection and recording are continuing in the background.

With reference to FIG. 28*c*, the STOP button in FIG. 28*b* was pushed and now this screen appeared. In this mode, the TIME 2805 box shows the current code execution time. The stopped button 2812 indicates that the display has stopped displaying new data. Pushing the Resume 2811 button will resume display of code execution where display left off. Obviously recording and writing to the file has gone beyond this point. Pushing the double forward arrow 2803 would catch the display up to the current recording time.

Figure 28D:
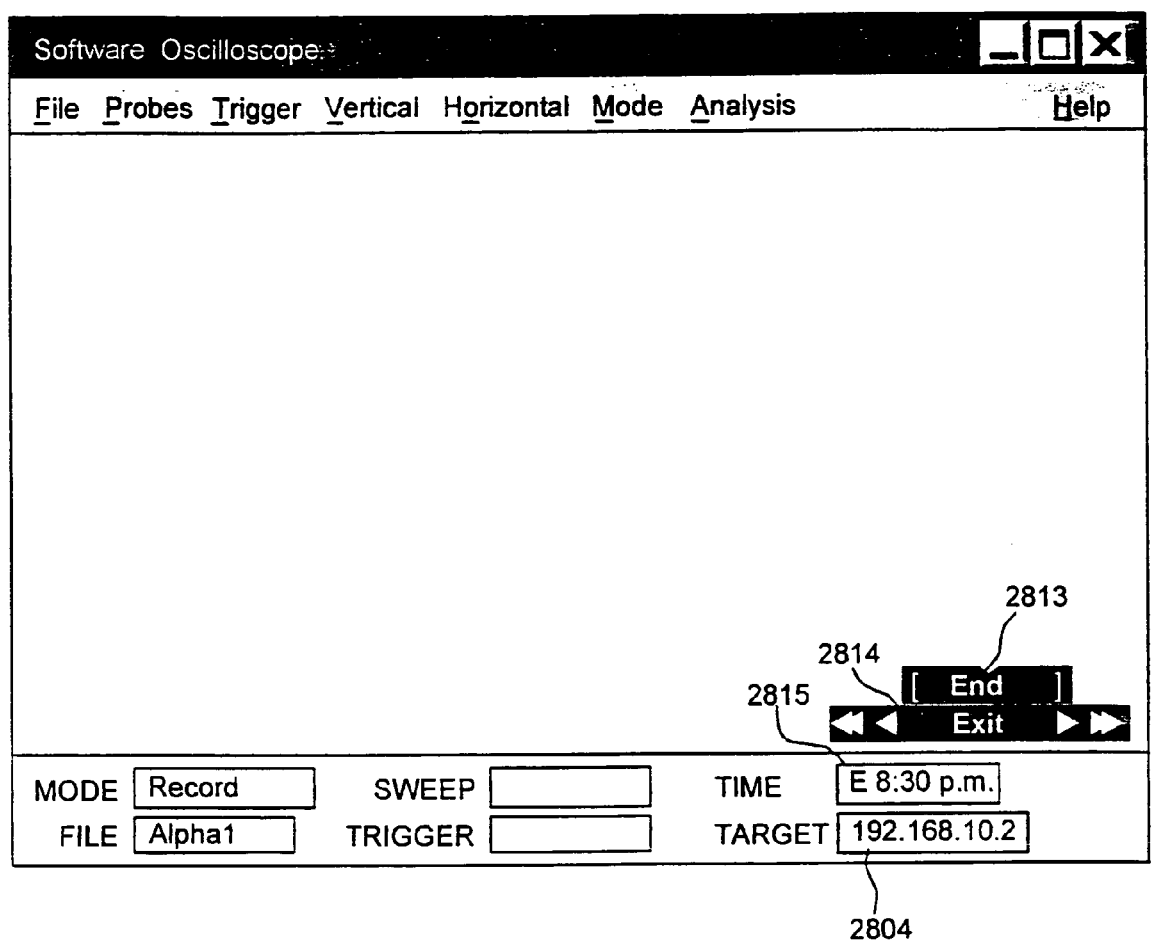
FIG. 28d is a diagrammatic illustration showing the software oscilloscope when recording has ended. The specified end time was reached and recording stopped. This data can be reviewed later by recalling the file Alpha 1 for playback.

With reference to FIG. 28*d*, the recording and data collection session has reached the end time 2815 the user had specified earlier. The indication End 2813 shows that recording is finished. The Exit button 2814 is pushed to exit and close this session. Data in File Alpha1 can be reloaded for viewing in playback.

Figure 29A:
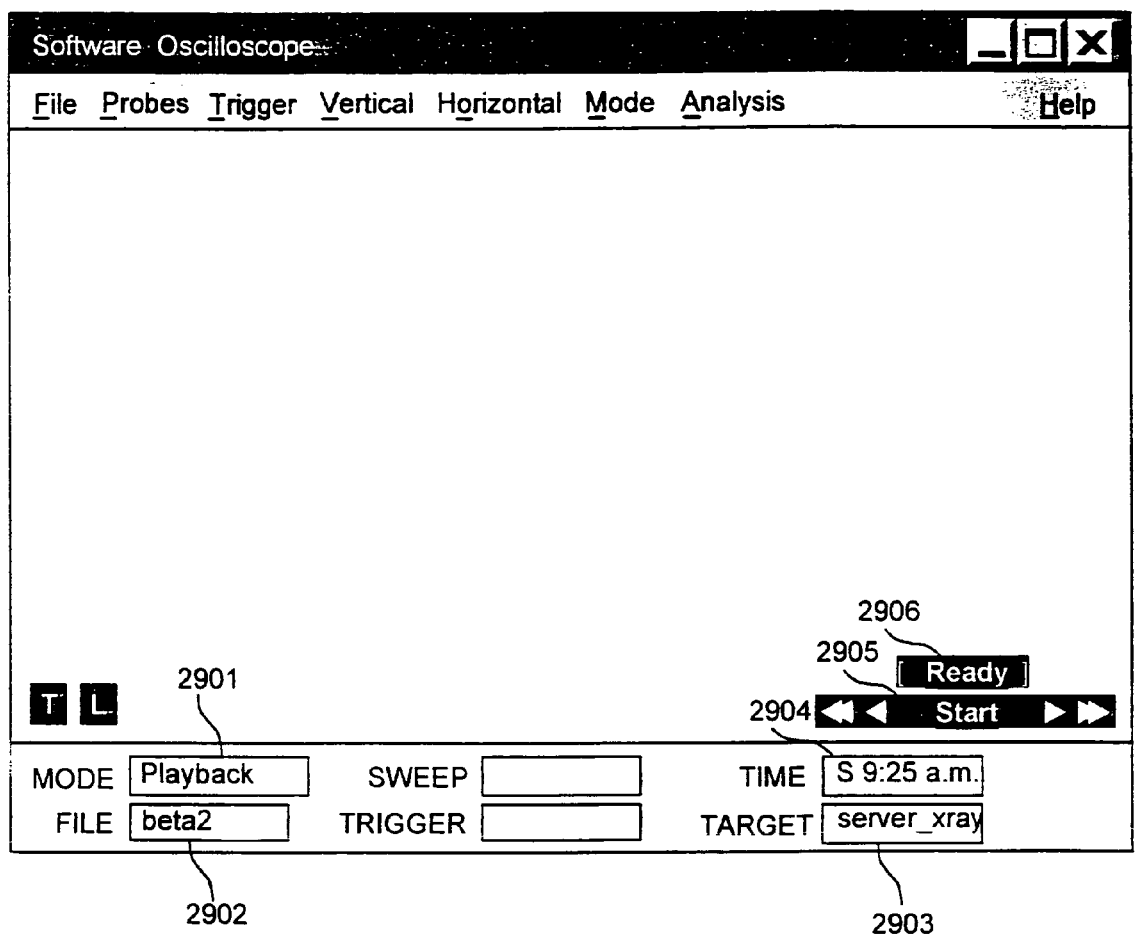
FIG. 29a is a diagrammatic illustration showing the software oscilloscope in preparation for playing back a file containing previously recorded data that was collected by observing and recording real time code execution. The file starting point is shown in the time window.

With reference to FIG. 29*a*, the software oscilloscope screen is shown in stand-by ready to start playing back an earlier recording and displaying code execution. The on screen text: Ready 2906 and the Mode text: Playback 2901 indicate that the software oscilloscope is ready for playback. In this example, the data were collected from observing code execution on a device called server_xray 2903. The start time for collecting that data was Set to 9:25 a.m. Obviously the Time entry 2904 can include a date as well as the time. The file to be played was selected from the File pull down menu. In this example it is called beta2 2902. To begin the playback, the Start button 2905 is pushed.

Figure 29B:
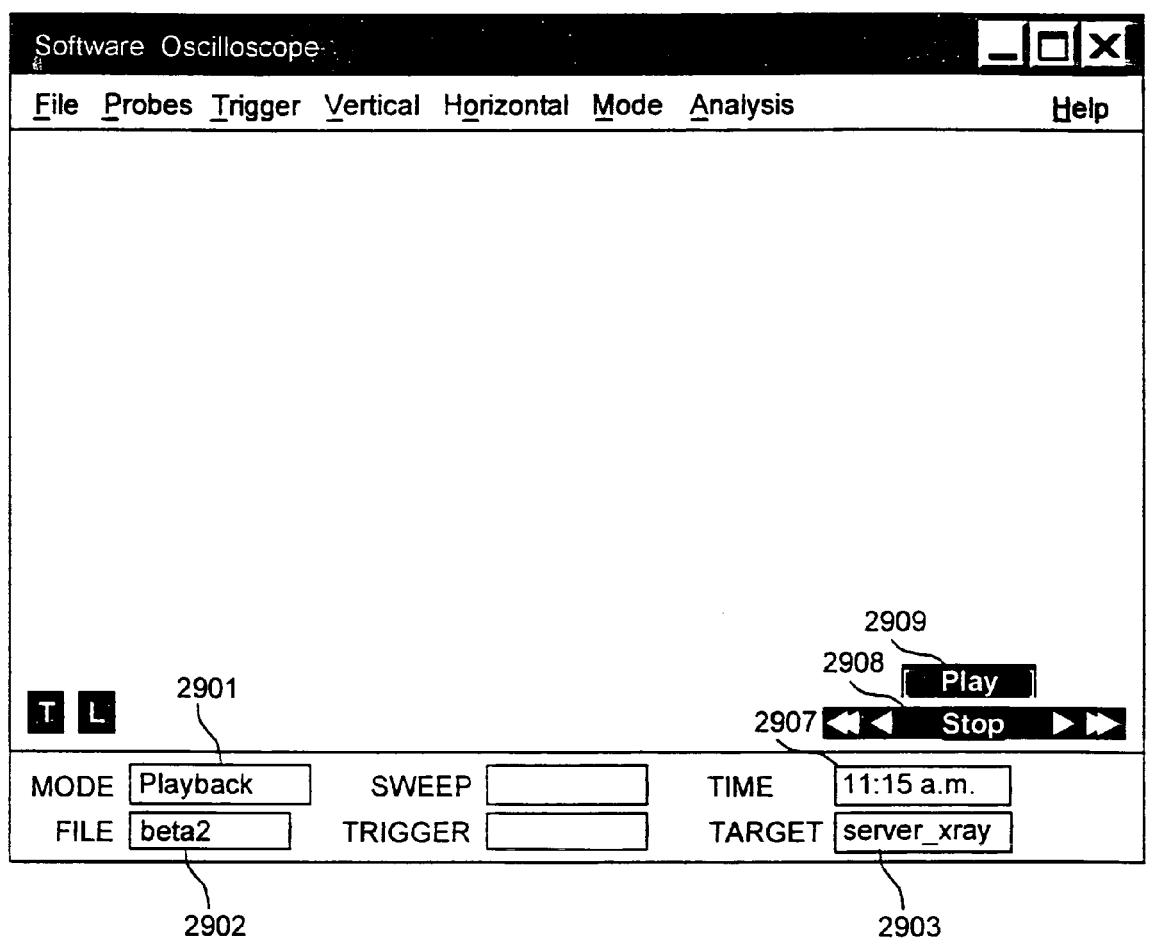
FIG. 29b is a diagrammatic illustration showing the software oscilloscope playing back data that had been recorded earlier. In this example, the saved file is called BETA2.

With reference to FIG. 29*b*, data is displayed on the screen the same as if this were the initial recording session. The word Play 2909 differentiates this from a recording session. Another indication is the MODE: Playback 2901 message.

Figure 29C:
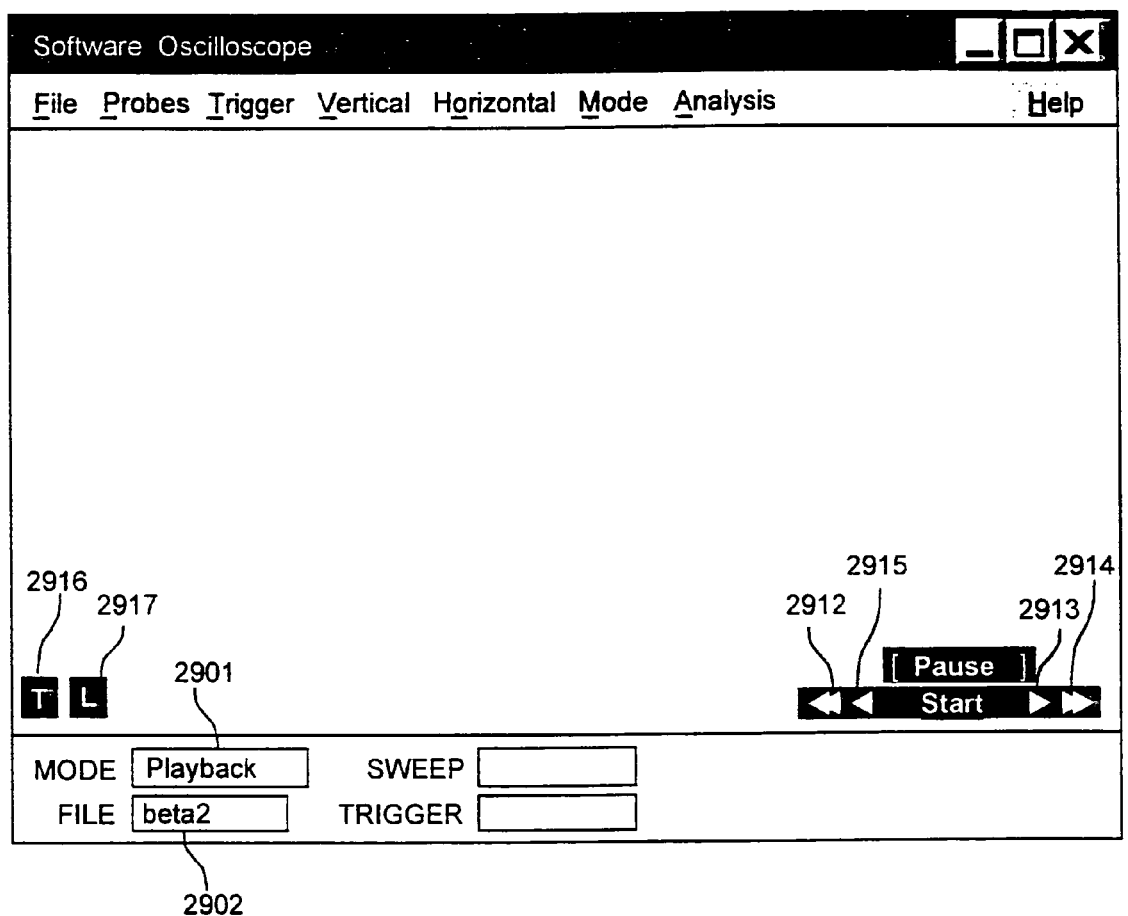
FIG. 29c is a diagrammatic illustration showing the software oscilloscope in pause. Playback has been halted. Detailed study of the displayed data is available using the items on the tool bar.

With reference to FIG. 29*c*, single steps 2915, 2913 speeded up steps and full speed steps 2912, 2914 can be selected, both forward and reverse, for detailed study. The Legend can be minimized by clicking and in the reduction appears as the boxed letter L 2917. The Tool Bar can be minimized and in the reduction appears as the boxed letter T 2916. Clicking them on with the mouse pointer alternates between full displays and minimized displays.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A method for monitoring the operation of a computer program including plural software code blocks, said method comprising the steps of:
   providing each code block with a probe representing the start and finish of the code block;
   operating the computer program, wherein each of said code blocks is sequentially executed;
   detecting the probe of each executed code block;
   comparing each probe with a clock signal and assigning a start time and a finish time for each executed code block; and
   displaying the start and finish times of each of said executed code blocks in a sequential manner on a video display.

2. The method of claim 1 wherein the operation of each executed code block is represented by a discrete area on said video display.

3. The method of claim 2 wherein the size of each discrete area corresponds to the execution time of an associated code block, with code blocks having a longer execution time represented by a larger discrete area than code blocks having a shorter execution time.

4. The method of claim 2 wherein the discrete areas representing the execution times of plural code blocks are aligned along a first axis and individual code blocks are executed in the order that they are positioned along said axis.

5. The method of claim 4 wherein said axis is aligned either horizontally or vertically on said display screen.

6. The method of claim 4 further comprising the step of displaying a time line along said axis for indicating the real time of execution of each of said code blocks.

7. The method of claim 4 wherein first code blocks executed during a first time period are aligned along said first axis and second code blocks executed during a second time period are aligned along a second axis, wherein said second axis is parallel to and displaced from said first axis.

8. The method of claim 7 further comprising the step of providing on the video display adjacent said first and second axes the times of execution of said first and second code blocks.

9. The method of claim 2 further comprising the step of providing a distinct pattern or image within each of said discrete areas for uniquely identifying each of said code blocks on the video display.

10. The method of claim 2 further comprising the step of assigning a distinct color to each of said discrete areas for uniquely identifying each of said code blocks on the video display.

11. The method of claim 2 further comprising the step of displaying data on the video display associated with a selected code block represented by a discrete area.

12. The method of claim 11 wherein the data associated with a selected code block is displayed in a pop-up box on the video display.

13. The method of claim 12 wherein said pop-up box is selected by positioning a mouse pointer over the displayed discrete area of a selected code block and actuating said mouse pointer.

14. The method of claim 13 wherein the display data associated with a selected code block includes the start time and execution duration time of said selected code block and the time and date of execution of said selected code block.

15. The method of claim 1 further comprising the step of displaying the start and finish times of two code blocks executed simultaneously in an overlapping manner, wherein a first symbol representing an operating time of a first code block extends into a second symbol representing an operating time of a second code block.

16. The method of claim 15 wherein said second symbol is displayed within said first symbol when said second code block executes within the time of execution of said first code block.

17. The method of claim 15 wherein the extent of overlapping of said first and second symbols represents the time of simultaneous execution of said first and second code blocks.

18. The method of claim 17 further comprising the step of displaying the time of execution of each of said first and second code blocks.

19. The method of claim 1 further comprising the step of transmitting the start and finish times of each of said executed code blocks via a data link, the Internet or a wireless link for display on a remotely located video display.

20. The method of claim 1 further comprising the steps of monitoring plural computer programs each operating at a different remote location and displaying the start and finish times of executed code blocks in each of said remotely operating computer programs on a single centrally located video display.

21. The method of claim 1 further comprising the step of designating a start and finish time during operation of the computer program for displaying only those code blocks starting or finishing within the designated start and finish times.

22. The method of claim 21 further comprising the step of changing the start and finish times for displaying code blocks starting or finishing within different designated start or finish times.

23. The method of claim 1 further comprising the step of storing the start and finish times of each of said executed code blocks for subsequent recall and display.

24. The method of claim 1 further comprising the step of performing a mathematical operation on the start and/or finish times of executed code blocks.

25. The method of claim 1 further comprising the step of magnifying or reducing in size a selected portion of the display screen.

26. The method of claim 1 further comprising the step of designating a selected code block for display over an extended period of time and displaying the start and finish times of said selected code block.

27. The method of claim 1 further comprising the step of stopping the video display for displaying current code block execution time while continuing to monitor and store data.

28. The method of claim 1 further comprising the steps of:
observing the displayed start and finish times of said executed code blocks over an extended period of time; and
determining the absence of displayed start and finish times of unexecuted code blocks no longer used in the computer program.

29. The method of claim 28 further comprising the step of deleting from the computer program unexecuted code blocks no longer used in the computer program.

30. The method of claim 1 further comprising the step of setting a trigger in the computer program for automatically determining an absence of displayed start and finish times of unexecuted code blocks no longer used in the computer program.

31. The method of claim 1 further comprising the step of setting a trigger for automatically displaying the start and finish times of selected executed code blocks.

32. The method of claim 1 further comprising the steps of:
entering an input to the computer for initiating an operation requiring the execution of associated software code blocks; and
viewing the video display for verifying execution of said associated software code blocks including observing the start and finish times of said associated software code blocks when executed.

33. The method of claim 1 wherein execution of selected software code blocks results in performance of an external event, said method further comprising the step of verifying execution of said selected software code blocks by observing the occurrence of said external event while viewing the presentation of the start and finish times of said selected software code blocks on said video display.

34. The method of claim 1 further comprising the step of observing on the video display the sequential execution of all of the software code blocks in the computer program.

35. A method for monitoring the operation of a computer program including plural software code blocks, said method comprising the steps of:
providing each code block with a probe representing the start and finish of the code block;
operating the computer program, wherein each of said code blocks is sequentially executed;
detecting the probe of each executed code block;
comparing each probe with a clock signal and assigning a start time and a finish time for each executed code block;
displaying the start and finish times of each of said executed code blocks in a sequential manner on a video display, wherein the operation of each executed code block is represented by a discrete area on said video display; and
connecting the discrete areas representing the execution times of plural code blocks with arrows, wherein each arrow is in a direction from an earlier executed code block to the next executed code block,
wherein each of said arrows is sequentially numbered in the order in which the transition from one code block to the next executed code block represented by that arrow occurs in time.

36. A method for remotely monitoring the operation of a computer program including the execution of plural software code blocks, said method comprising the steps of:
providing each code block with a probe representing the start and finish of the code block;
operating the computer program in executing each of the code blocks;
detecting the probe of each executed code block;
comparing each probe with a clock signal and assigning a start time and a finish time for each executed code block;

transmitting the start and finish times of each executed code block to a location remote from the location of operation of the computer program; and displaying the start and finish times of each executed code block at said remote location during the operation of the computer program.

37. The method of claim 36 including the step of transmitting the start and finish times via the Internet to said remote location.

38. The method of claim 36 further including the step of transmitting the start and finish times via a wireless link to said remote location.

39. The method of claim 36 wherein said start and finish times are transmitted from outer space to the earth or from the earth to outer space.

40. The method of claim 36 wherein said start and finish times are transmitted via a direct serial connection, a Universal Serial Bus connection, or a Firewire connection.

41. A method for monitoring and changing the operation of a computer program, wherein plural software code blocks are sequentially executed, said method comprising the steps of:

providing each code block with a probe representing the start and finish of the code block;

operating the computer program in executing each of the code blocks;

detecting the probe of each executed code block;

comparing each probe with a clock signal and assigning a start time and a finish time for each executed code block;

displaying the start and finish times of each of said executed code blocks in a sequential manner on a video display during operation of the computer program;

detecting the presence of idle time in the computer operation, wherein no software code block is undergoing execution;

displaying said idle time in real time; and incorporating at least one additional software code block in any detected idle time.

42. The method of claim 41 further comprising the step of confirming execution of said at least one additional software code block by observing on the video display the start and finish times of said at least one additional software code block.

43. A method for analyzing operation of a computer program at the time of an interruption in operation of the program, the computer program including plural software code blocks executed over time, said method comprising the steps of:

providing each code block with a probe representing the start and finish of the code block;

operating the computer program in executing each of the code blocks;

noting the time of occurrence of the interruption in operation of the computer program;

detecting the probe of each of the executed code blocks;

comparing each probe with a clock signal and assigning a start time and a finish time for each executed code block;

displaying the start and finish times of each of said executed code blocks in a sequential manner on a video display;

comparing the start and finish times of each executed code block with the time of occurrence of the interruption;

determining the code blocks executed at the time of interruption of the computer program;

determining if the code blocks executed at the time of interruption of the computer program contributed to the interruption; and changing or deleting any of the code blocks executed at the time of interruption of the computer program if any of these code blocks contributed to the interruption.

44. A method for enhancing the efficiency of the operation of a computer program wherein plural software code blocks are sequentially executed over time, said method comprising the steps of:

providing each software code block with a probe representing the start and finish of the code block;

operating the computer program in executing the code blocks;

comparing each probe with a clock signal and assigning a start time and a finish time for each executed code block;

displaying the start and finish times of each of said executed code blocks in a sequential manner on a video display;

noting one or more blocks of idle time of the computer operation when no software code block is being executed; and inserting one or more additional software code blocks in some or all of each of said blocks of idle time for increasing the number of code blocks executed by the computer program.

45. A method for evaluating the operation of a computer program comprised of plural software code blocks sequentially executed over time in creating a data file, said method comprising the steps of:

providing each software code block with a probe representing the start and finish of the code block;

operating the computer program in executing the code blocks;

comparing each probe with a clock signal and assigning a start time and a finish time for each executed code block;

storing the start and finish times for each executed code block in the data file;

completing operation of the computer program;

subsequently recalling the data file; and displaying the start and finish times of each of said executed code blocks in a sequential manner on a video display.

46. The method of claim 45 further comprising the step of displaying the start and finish times of said executed code blocks at a faster rate than real time.

47. The method of claim 45 further comprising the step of displaying the start and finish times of said executed code blocks at a slower rate than real time.

* * * * *